US012287598B2

(12) United States Patent
Tsunoda et al.

(10) Patent No.: US 12,287,598 B2

(45) Date of Patent: Apr. 29, 2025

(54) METHOD OF ANALYZING STATE OF IMAGE FORMING APPARATUS BASED ON RUNNING SOUND

(71) Applicant: CANON KABUSHIKI KAISHA, Tokyo (JP)

(72) Inventors: Kaoru Tsunoda, Shizuoka (JP); Daisuke Momiyama, Shizuoka (JP); Masaki Kobayashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/483,365

(22) Filed: Oct. 9, 2023

(65) Prior Publication Data

US 2024/0118652 A1 Apr. 11, 2024

(30) Foreign Application Priority Data

Oct. 11, 2022 (JP) ................................ 2022-163585

(51) Int. Cl.
*G03G 15/00* (2006.01)

(52) U.S. Cl.
CPC ......... *G03G 15/55* (2013.01); *G03G 15/5016* (2013.01)

(58) Field of Classification Search
CPC .. G03G 15/55; G03G 15/5079; G03G 15/553; G03G 15/502; G03G 2215/00637; G03G 15/5016; G03G 2215/00109
See application file for complete search history.

(56) References Cited

U.S. PATENT DOCUMENTS

| | | | | |
|---|---|---|---|---|
| 10,073,399 | B1 * | 9/2018 | Osadchyy | G03G 15/5079 |
| 2003/0077086 | A1 * | 4/2003 | Phillips | G03G 15/553 399/24 |
| 2020/0393786 | A1 * | 12/2020 | Matsumoto | G03G 15/502 |
| 2021/0055896 | A1 * | 2/2021 | Portnoy | G03G 15/553 |

FOREIGN PATENT DOCUMENTS

| | | | |
|---|---|---|---|
| JP | 2006208074 | A | 8/2006 |
| JP | 2008092358 | A | 4/2008 |
| JP | 2017049759 | A | 3/2017 |
| JP | 2021071657 | A | 5/2021 |
| JP | 2021117493 | A | 8/2021 |

* cited by examiner

*Primary Examiner* — Jessica L Eley
(74) *Attorney, Agent, or Firm* — Canon U.S.A., Inc. IP Division

(57) ABSTRACT

A system performs a first analysis operation in which an operation history of an image forming apparatus and input information are analyzed, an issuance operation in which, in a case where a result of an analysis of the first analysis operation satisfies notification conditions, a second analysis operation in which a confidence for the result of the analysis of the first analysis operation is obtained, a transmission operation in which, in a case where the confidence is less than a threshold, a message requesting further input of input information is transmitted, and a control operation in which the notification conditions are controlled based on the input information obtained as a response to the message.

5 Claims, 23 Drawing Sheets

FIG. 4

| MEASUREMENT DATE AND TIME | ACTUATOR | SOUND LEVEL (DECIBEL) |
|---|---|---|
| 2022/1/1 12:00:01 | MOTOR M1 | 40 |
| 2022/1/1 12:00:02 | MOTOR M2 | 50 |
| 2022/1/1 12:00:03 | MOTOR M4<br>MOTOR M1 | 40 |
| 2022/1/1 12:00:04 | NONE | 30 |
| 2022/1/1 12:00:05 | MOTOR M1 | 30 |
| 2022/1/1 12:00:06 | MOTOR M3 | 40 |
| 2022/1/1 12:00:07 | MOTOR M4 | 10 |
| 2022/1/1 12:00:08 | MOTOR M1 | 45 |
| 2022/1/1 12:00:09 | MOTOR M2 | 45 |
| 2022/1/1 12:00:10 | MOTOR M4 | 20 |
| 2022/1/1 12:00:11 | MOTOR M1 | 30 |
| 2022/1/1 12:00:12 | MOTOR M3 | 50 |
| 2022/1/1 12:00:13 | MOTOR M4 | 15 |
| 2022/1/1 12:00:14 | MOTOR M1 | 30 |
| 2022/1/1 12:00:15 | MOTOR M2 | 45 |
| 2022/1/1 12:00:16 | MOTOR M4 | 25 |
| 2022/1/1 12:00:17 | MOTOR M4 | 5 |
| ... | ... | ... |
| 2022/4/1 19:00:37 | MOTOR M1 | 40 |
| 2022/4/1 19:00:38 | MOTOR M3 | 60 |
| 2022/4/1 19:00:39 | MOTOR M4 | 100 |
| 2022/4/1 19:00:40 | MOTOR M2 | 50 |
| 2022/4/1 19:00:41 | MOTOR M4 | 90 |
| 2022/4/1 19:00:42 | MOTOR M4 | 80 |
| 2022/4/1 19:00:43 | MOTOR M1 | 30 |
| 2022/4/1 19:00:44 | MOTOR M1 | 35 |
| 2022/4/1 19:00:45 | MOTOR M2 | 55 |
| 2022/4/1 19:00:46 | MOTOR M4 | 95 |
| 2022/4/1 19:00:47 | MOTOR M1 | 45 |
| 2022/4/1 19:00:48 | MOTOR M3 | 65 |
| 2022/4/1 19:00:49 | MOTOR M4<br>MOTOR M1 | 105 |
| 2022/4/1 19:00:50 | MOTOR M1 | 30 |
| 2022/4/1 19:00:51 | MOTOR M2 | 55 |
| 2022/4/1 19:00:52 | MOTOR M4<br>MOTOR M1 | 85 |

FIG. 6A

| AREA | ACTUATOR | UNIT |
|---|---|---|
| FEEDING AREA | MOTOR M1 | FEEDING ROLLER<br>CONVEYANCE ROLLER<br>REGISTRATION ROLLER |
| PRINT AREA | MOTOR M2<br>MOTOR M3 | PHOTOSENSITIVE DRUM 1K<br>PHOTOSENSITIVE DRUM 1Y, 1M, 1C |
| FIXING AREA | MOTOR M4 | PRESSING ROLLER<br>FIXER<br>DISCHARGE ROLLER |

FIG. 6B

| AREA | REFERENCE LEVEL (DECIBEL) | ABNORMAL SOUND LEVEL (DECIBEL) |
|---|---|---|
| FEEDING AREA | 35 | 0 |
| PRINT AREA | 45 | 10 |
| FIXING AREA | 15 | 80 |

FIG. 6C

| INPUT INFORMATION | CORRECTION VALUE FOR THRESHOLD |
|---|---|
| DISTRACTING | −5 |
| NORMAL | 0 |
| NOT DISTRACTING | +5 |

FIG. 7

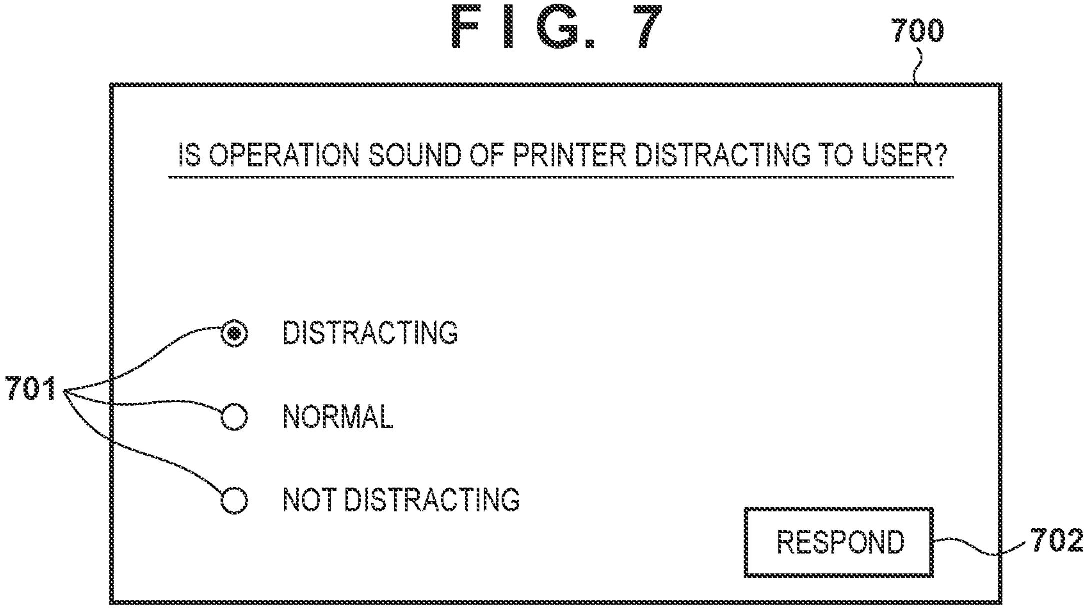

FIG. 14A

| DATE AND TIME OF COMPUTATION | AREA | ABNORMAL SOUND LEVEL (DECIBEL) |
|---|---|---|
| 2022/1/1 12:00:00 | FIXING AREA | 15 |
| 2022/1/1 12:00:00 | FEEDING AREA | 35 |
| ... | ... | ... |
| 2022/6/4 14:00:00 | PRINT AREA | 80 |
| 2022/6/4 14:00:00 | FIXING AREA | 70 |
| 2022/6/8 16:00:00 | FIXING AREA | 10 |

FIG. 14B

| DATE AND TIME OF REPLACEMENT | REPLACED UNIT |
|---|---|
| 2022/5/18 12:00:00 | FIXER |
| 2022/5/18 12:00:00 | PHOTOSENSITIVE DRUM 1Y,1M,1C |

FIG. 14C

| DATE AND TIME OF MAINTENANCE | TARGET UNIT |
|---|---|
| 2022/6/1 0:00:00 | FEEDING UNIT |

FIG. 14D

| MAINTENANCE HISTORY | ABNORMAL SOUND DETERMINATION |
|---|---|
| MAINTENANCE PERFORMED WITHIN ONE MONTH | LESS LIKELY TO BE ABNORMAL SOUND GENERATION SOURCE |
| MAINTENANCE NOT PERFORMED WITHIN ONE MONTH | LIKELY TO BE ABNORMAL SOUND GENERATION SOURCE |

| AREA | ABNORMAL SOUND LEVEL (DECIBEL) |
|---|---|
| FEEDING AREA | 50 |
| PRINT AREA | 40 |
| FIXING AREA | 78 |

| CAN ABNORMAL SOUND GENERATION SOURCE BE IDENTIFIED | CONFIDENCE |
|---|---|
| POSSIBLE | RELIABLE |
| NOT POSSIBLE | NOT RELIABLE |

METHOD OF ANALYZING STATE OF IMAGE FORMING APPARATUS BASED ON RUNNING SOUND

BACKGROUND

Field of the Disclosure

The present disclosure relates to a method of analyzing a state of an image forming apparatus based on a running sound.

Description of the Related Art

Conventionally, a server analyzes a maintenance history or an operation history of an image forming apparatus and then issues a notification prompting maintenance at an appropriate timing that is based on a result of the analysis (Japanese Patent Laid-Open No. 2017-049759 and Japanese Patent Laid-Open No. 2021-071657). A user can thus smoothly use the image forming apparatus.

Japanese Patent Laid-Open No. 2017-049759 and Japanese Patent Laid-Open No. 2021-071657 assume that a server can sufficiently collect a maintenance history or an operation history. Meanwhile, if a server cannot obtain a sufficient maintenance history, a timing at which a maintenance notification is issued may not be appropriate. For example, in order to optimize a timing at which a maintenance notification is issued in regards to a fixer, a maintenance history indicating when maintenance of the fixer was last performed is necessary. However, if a person in charge of maintenance forgets to input or transmit a maintenance history, a server cannot store a correct maintenance history. In such a case, the server may issue a maintenance notification that maintenance is necessary even for a fixer for which maintenance has recently been performed.

SUMMARY

The present disclosure provides an image forming system comprising: a memory configured to store a program; and at least one processor configured to perform operations according to the program, wherein the operations include: a first analysis operation in which an operation history of an image forming apparatus and input information inputted from the image forming apparatus or a terminal apparatus are analyzed; an issuance operation in which, in a case where a result of an analysis of the first analysis operation satisfies notification conditions, a maintenance notification about a maintenance of the image forming apparatus is issued; a second analysis operation in which a confidence for the result of the analysis of the first analysis operation is obtained by analyzing the operation history of the image forming apparatus; a transmission operation in which, in a case where the confidence is less than a threshold, a message requesting further input of input information is transmitted to the image forming apparatus or the terminal apparatus; and a control operation in which the notification conditions are controlled based on the input information obtained as a response to the message.

Further features of the present disclosure will become apparent from the following description of exemplary embodiments (with reference to the attached drawings).

BRIEF DESCRIPTION OF THE DRAWINGS

FIG. 4 is a diagram illustrating an operation history.

FIGS. 6A to 6C are diagrams for explaining a component list, analysis results, and a correction table.

FIG. 7 is a diagram for explaining a UI.

FIGS. 14A to 14D are diagrams for explaining an analysis history, replacement information, maintenance information, and a determination rule.

DESCRIPTION OF THE EMBODIMENTS

Figure 1:
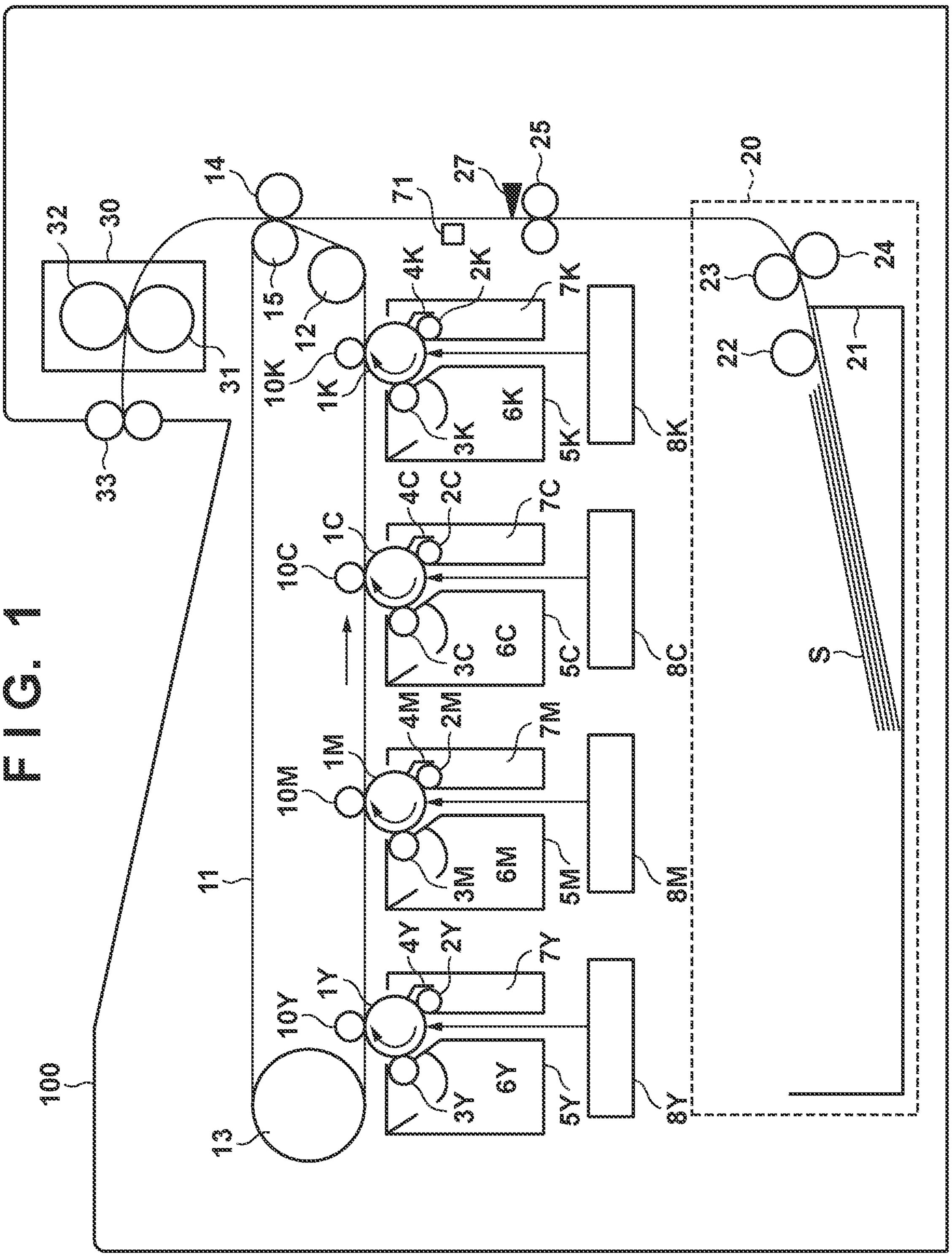
FIG. 1 is a diagram for explaining a printer.

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted.

First Embodiment

[Image Forming Apparatus]

As illustrated in FIG. 1, a printer 100 is an electrophotographic image forming apparatus. However, an electrophotographic method is only one example, and another printing method, such as an inkjet printing method or a thermal transfer method, may be employed. The printer 100 outputs a color image by overlaying four colors of toner, such as yellow “Y”, magenta “M”, cyan “C”, and black “K”. In FIG. 1, a letter, Y, M, C, or K, is attached to the end of a reference numeral; however, when matters common to the four colors are described, the letter, Y, M, C, or K, is omitted from the reference numeral.

A process cartridge 5 includes a toner container 6, which stores toner. The process cartridge 5 further includes a photosensitive drum 1, which is an image carrying member. The process cartridge 5 further includes a charging roller 2, a developing roller 3, a cleaning blade 4, and a waste toner container 7.

The photosensitive drum 1 rotates in a direction of an arrow. The charging roller 2 charges a surface of the photosensitive drum 1 to a predetermined negative potential by being supplied with a predetermined negative voltage (charging voltage). A laser unit 8 is arranged below the process cartridge 5. The laser unit 8 is an exposure apparatus or an optical scanning apparatus for forming an electrostatic latent image by irradiating light based on an image signal onto the photosensitive drum 1. The developing roller 3 forms a toner image by adhering toner supplied from the toner container 6 to the electrostatic latent image. The developing roller 3 is supplied with a predetermined negative voltage (developing voltage).

An intermediate transfer member unit is configured by an intermediate transfer member 11, a driving roller 12, a tension roller 13, and an opposing roller 15. The intermediate transfer member 11 is, for example, an endless belt. The driving roller 12 is a roller for rotating the intermediate transfer member 11. The tension roller 13 and the opposing roller 15 are rollers that are driven to be rotated by the intermediate transfer member 11.

A primary transfer roller 10 is arranged on an inner side of the intermediate transfer member 11 so as to oppose the photosensitive drum 1. The primary transfer roller 10 is supplied with a transfer voltage. By the photosensitive drum 1 rotating, the toner image on the photosensitive drum 1 is conveyed to a primary transfer nip. The primary transfer nip is a position at which the photosensitive drum 1 and the primary transfer roller 10 oppose. The primary transfer roller 10 transfers the toner image from the photosensitive drum 1 to the intermediate transfer member 11. YMCK toner images are thus overlaid on the intermediate transfer member 11 and thereby form a full color image. The cleaning blade 4 is a cleaning member for cleaning toner remaining on the photosensitive drum 1 and storing the toner in the waste toner container 7. A feeding unit 20 is configured by a feeding cassette 21, a feeding roller 22, a conveyance roller 23, a separation roller 24, and the like. The feeding cassette 21 stores a plurality of sheets S. The feeding roller 22 feeds a sheet S from the feeding cassette 21 to a conveyance path. The conveyance roller 23 conveys the sheet S further downstream in the conveyance path. The separation roller 24 is a roller for separating one sheet S from the plurality of sheets S.

A registration roller pair 25 is arranged further downstream of the feeding unit 20 in the conveyance path. The registration roller pair 25 corrects skewing of the sheet S that has been conveyed from the feeding unit 20 and then conveys the sheet S further downstream. A sheet sensor 27 is arranged downstream of the registration roller pair 25. The sheet sensor 27 detects the arrival of a leading edge of the sheet S and a timing at which a trailing edge of the sheet S passes.

A secondary transfer roller 14 is provided further downstream of the registration roller pair 25. The secondary transfer roller 14 is arranged so as to oppose the opposing roller 15 and forms a secondary transfer nip in tandem with the intermediate transfer member 11. The secondary transfer roller 14 transfers the toner images from the intermediate transfer member 11 to the sheet S. In order to facilitate transfer of the toner images, a positive voltage (secondary transfer voltage) is applied to the secondary transfer roller 14.

A fixer 30 is arranged downstream of the secondary transfer nip. The fixer 30 includes a fixing film 31 and a pressing roller 32 and fixes the toner images on the sheet S by applying heat and pressure to the sheet S and the toner images. A discharge roller pair 33 is provided downstream of the fixer 30. The discharge roller pair 33 discharges the sheet S out of the image forming apparatus.

A result of detection of the sheet sensor 27 is used for determining early arrival and late arrival of the sheet S. Early arrival refers to the sheet S arriving earlier than a timing scheduled for the sheet sensor 27. Late arrival refers to the sheet S arriving later than a timing scheduled for the sheet sensor 27. These phenomena may be referred to as conveyance errors. In a case where the sheet sensor 27 cannot detect the sheet S even if the feeding roller 22 retries feeding, it is determined that a jam of the sheet S has occurred.

A sound collector 71 includes, for example, a microphone for receiving sound waves. The sound collector 71 is arranged between the sheet sensor 27 and the secondary transfer roller 14. The sound collector 71 may include an MEMS microphone. MEMS is an abbreviation for micro electro mechanical system. The MEMS microphone is a converter for converting vibrations of a vibration plate caused by pressure into voltage changes. The sound collector 71 need only be able to receive sound waves and thus may be another type of microphone, such as a condenser microphone.

[Image Forming System]

Figure 2:
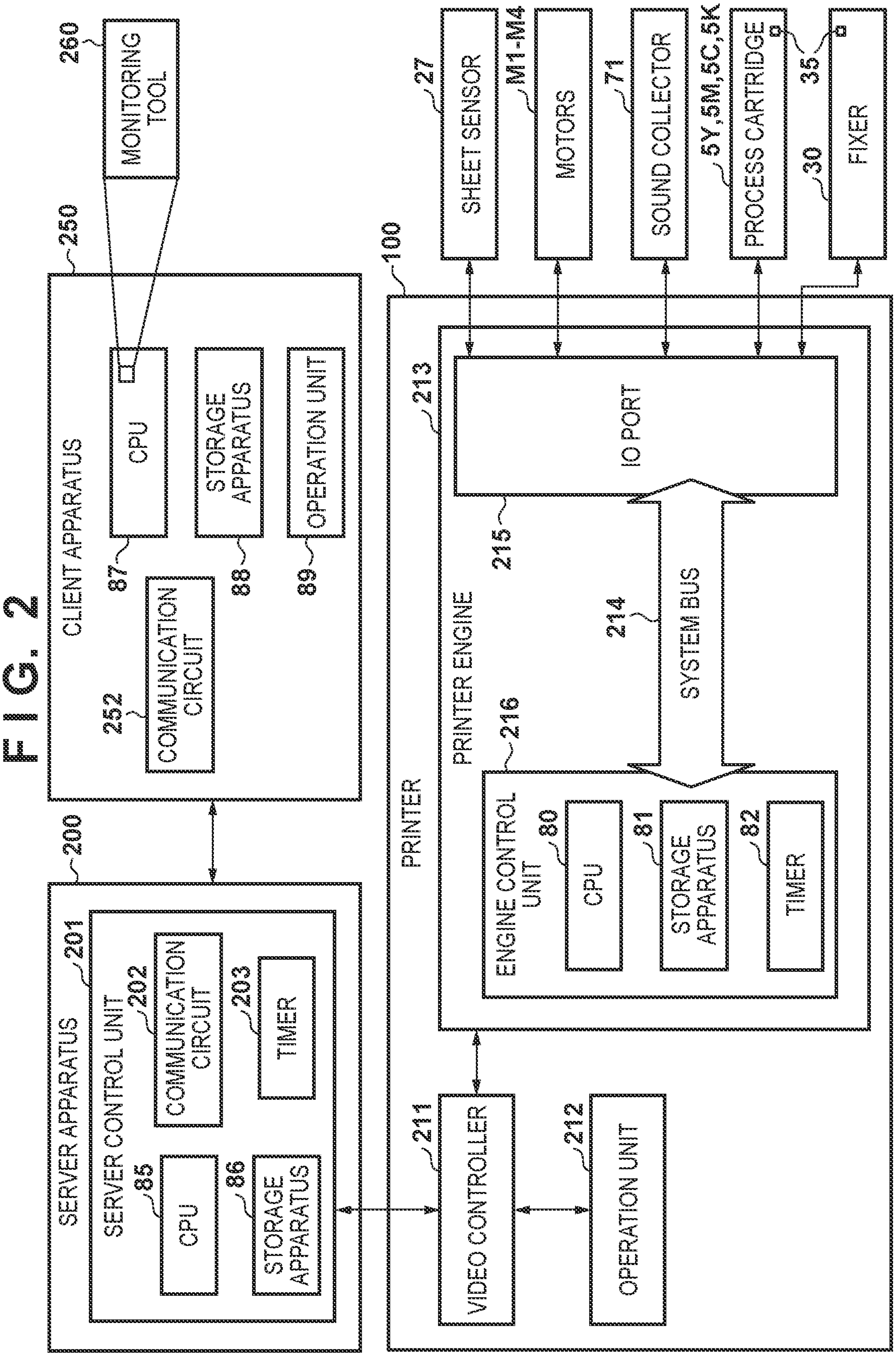
FIG. 2 is a diagram for explaining an image forming system.

FIG. 2 is a diagram illustrating each piece of hardware of the printer 100, a server apparatus 200, and a client apparatus 250. The server apparatus 200 can communicate with one or more printers 100 and one or more client apparatuses 250 over a network, such as the Internet. The server apparatus 200 is a computer (information processing apparatus) that is in charge of maintaining and managing one or more printers 100. The client apparatus 250 can communicate with the server apparatus 200 over a network and is, for example, a computer capable of being operated by a dealer's maintenance worker or an administrator of the printer 100. The dealer is, for example, a company that sells the printer 100, a company that is in charge of maintenance of the printer 100, and the like.

The printer 100 includes a video controller 211, an operation unit 212, and a printer engine 213. The video controller 211 is an integrated circuit or a control circuit board that includes a communication circuit for receiving image data from a host computer, an image scanner, or the like; an image processing circuit for generating an image signal for the printer engine 213 by converting the image data; a CPU; and the like. The CPU is an abbreviation for central processing unit. The video controller 211 may communicate with the server apparatus 200 via the communication circuit. The operation unit 212 includes a display apparatus for displaying information to a user and an input apparatus for accepting input of an instruction from the user. The input apparatus may be realized by a touch panel sensor for detecting a touch of the user. Therefore, the operation unit 212 may be referred to as an operation panel. In addition, the input apparatus may include a power switch, an operation button, and the like. The video controller 211 transmits image signals and print instructions to the printer engine 213. The display apparatus is, for example, a liquid crystal display, an organic EL display, or the like. EL is an abbreviation for electroluminescence.

The printer engine 213 includes an engine control unit 216, a system bus 214, and an IO port 215. IO is an abbreviation for input/output. The engine control unit 216 includes a CPU 80, a storage apparatus 81, and a timer 82. The storage apparatus 81 includes a read-only memory (ROM) and a random access memory (RAM). A ROM region of the storage apparatus 81 stores programs and various types of data. A RAM region is used as a work region. The timer 82 may include a real-time clock (RTC), a counter circuit, and the like.

The CPU 80 realizes various functions by executing programs. The CPU 80 receives a result of detection of the sheet sensor 27 or the sound collector 71 via the system bus 214 and the IO port 215 and provides a driving signal to motors M1 to M4. A driving circuit for generating a current for driving the motors M1 to M4 may be provided between the IO port 215 and the motors M1 to M4. The motor M1 is a motor for driving the feeding roller 22. The motor M2 is a motor for driving the photosensitive drum 1K. The motor M3 is a motor for driving the photosensitive drums 1Y, 1M, and 1C. The motor M4 is a motor for driving the pressing roller 32 and the fixer 30 (fixing film 31). The CPU 80 can access replaceable components (e.g., the process cartridge 5 and the fixer 30) via the IO port 215 and read a serial ID held in respective memories 35 of the components. The CPU 80 thus monitors whether a component has been replaced.

The server apparatus 200 includes a server control unit 201. The server control unit 201 is a control board that includes a CPU 85, a storage apparatus 86, a communication circuit 202, and a timer 203. The CPU 85 executes a program stored in the storage apparatus 86 and reads and writes various types of data. The CPU 85 includes a CPU core and a GPU core. GPU is an abbreviation for graphics processing unit. The storage apparatus 86 includes a RAM, a ROM, a hard disk drive (HDD), and a solid-state drive (SSD). The CPU 85 may realize a virtual environment according to a program, and the server may be implemented by that virtual environment. The server control unit 201 can transfer information to and from the engine control unit 216 via the video controller 211. The server control unit 201 transfers information to and from a monitoring tool 260 realized by the client apparatus 250 via a network, such as the Internet. The communication circuit 202 includes a circuit for communicating with the printer 100 and the client apparatus 250. The timer 203 may include a real-time clock (RTC), a counter circuit, and the like.

The client apparatus 250 is a computer that includes a CPU 87, a storage apparatus 88, an operation unit 89, and a communication circuit 252. The client apparatus 250 may be any of a personal computer (PC), a smartphone, and a tablet terminal. The CPU 87 is a processor that functions as the monitoring tool 260 by executing a program stored in the storage apparatus 88. The storage apparatus 88 may include a RAM, a ROM, an HDD, and an SSD. The operation unit 89 includes a display apparatus (liquid crystal display) and an input apparatus (such as a keyboard, a mouse, and a touch detection sensor). The communication circuit 252 includes a circuit for communicating with the server apparatus 200. The monitoring tool 260 receives information from the server control unit 201 and displays the received information on the operation unit 89. The monitoring tool 260 may be realized by a PC or a server computer but may be implemented in a virtual environment, such as a virtual machine. The monitoring tool 260 may refer to a program itself that is executed by the CPU 87, an instance of that program, or the client apparatus 250 itself.

[Functions of First Embodiment]

Figure 3:
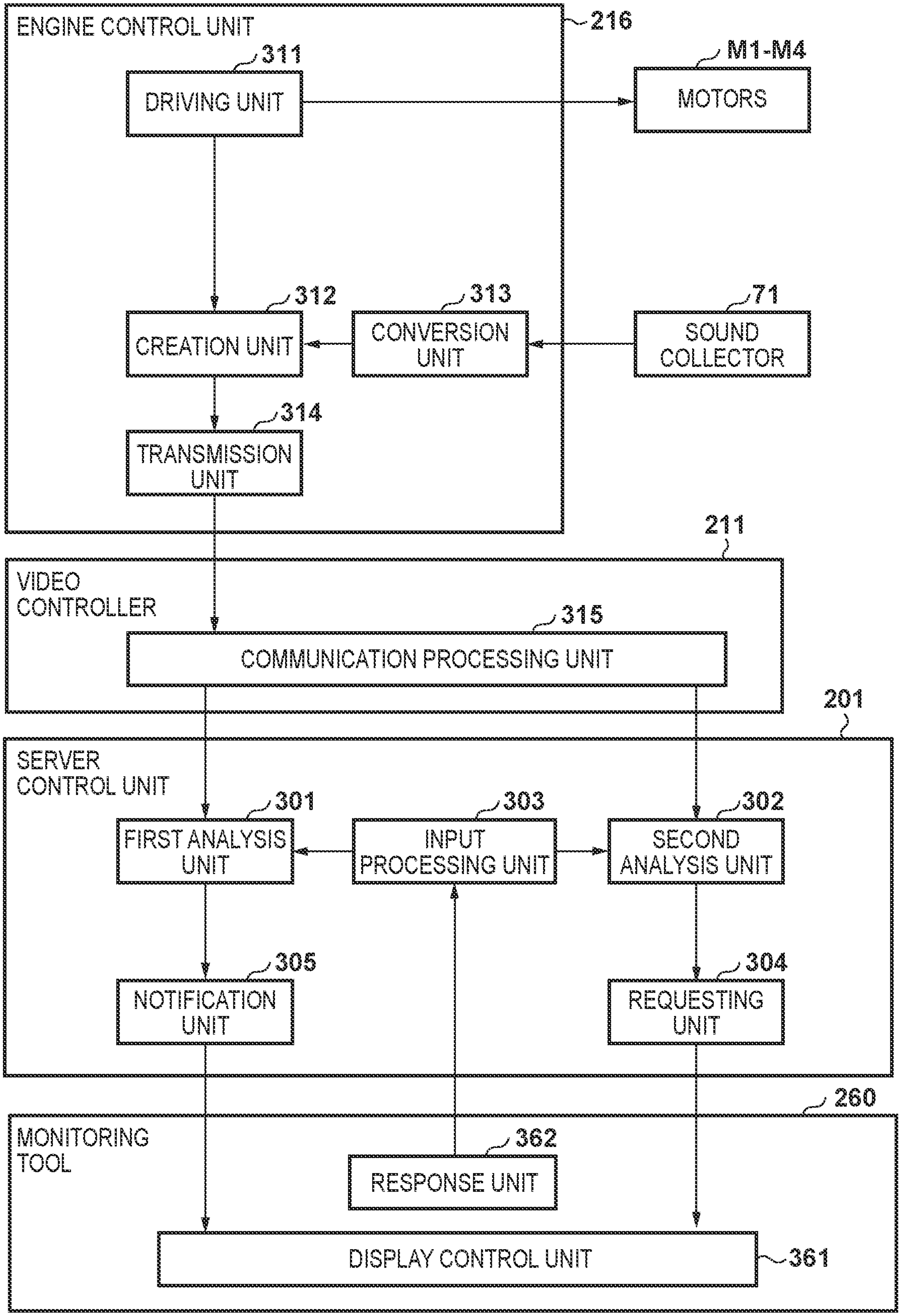
FIG. 3 is a diagram for explaining functions of the image forming system.

FIG. 3 illustrates an example of functions implemented in the engine control unit 216, the server control unit 201, and the monitoring tool 260. A function of the engine control unit 216 is realized by the CPU 80 executing a program stored in the ROM region of the storage apparatus 81. A function of the server control unit 201 is realized by the CPU 85 executing a program stored in the storage apparatus 86. A function of the monitoring tool 260 is realized by the CPU 87 executing a program stored in the storage apparatus 88.

Upon receiving a print instruction from the video controller 211, the engine control unit 216 outputs an instruction for driving the motors M1 to M4 to a driving unit 311. The driving unit 311 drives the motors M1 to M4 according to the driving instruction. The driving unit 311 identifies a driving target based on the driving instruction and then obtains, from the timer 82, a driving date and time at which the driving target had been driven. The driving unit 311 outputs the driving target and the driving date and time to a creation unit 312 or stores the driving target and the driving date and time in the storage apparatus 81. The driving unit 311 rotates the feeding roller 22, the conveyance roller 23, and the registration roller pair 25 by driving the motor M1. The motor M2 rotates the intermediate transfer member 11 by driving the driving roller 12. The motor M2 also rotates the photosensitive drum 1K. The motor M3 rotates the photosensitive drums 1Y, 1M, and 1C. The motor M4 drives the pressing roller 32, the fixing film 31 of the fixer 30, and the discharge roller pair 33.

The sound collector 71 outputs a sound signal that corresponds to a loudness of a collected sound to a conversion unit 313. The conversion unit 313 converts the inputted sound signal into a sound level, which indicates a loudness of the sound. The conversion unit 313 may include an amplifier circuit for amplifying a sound signal and an analog-to-digital conversion circuit for converting an analog signal into a digital signal.

The creation unit 312 collects a sound level and information that represents respective driving states of the motors M1 to M4 (hereinafter, actuator information) and creates an operation history. The creation unit 312 may obtain a date and time at which the sound level had been measured (hereinafter, measurement date and time) from the timer 82 and include that in the operation history. In addition, the creation unit 312 references the driving date and time included in the actuator information and includes, in the operation history, the actuator information that includes a driving date and time that corresponds to the measurement date and time. If there is no actuator that had been operating at the measurement date and time, there is no actuator information that includes a driving date and time that matches the measurement date and time. In such a case, the creation unit 312 stores "none" in the operation history. The operation history is temporarily stored in the RAM region of the storage apparatus 81.

A transmission unit 314 collects the operation history from the creation unit 312 or the storage apparatus 81 and then transmits the operation history to the video controller 211. A communication processing unit 315 of the video controller 211 transfers the operation history to the server control unit 201.

FIG. 4 illustrates an example of an operation history. The server control unit 201 stores the operation history in the storage apparatus 86. The operation history includes the measurement date and time, a name of the actuator that had been operating at the measurement date and time, and a sound level measured at the measurement date and time.

When a sufficient amount of operation history is stored in the storage apparatus 86, a first analysis unit 301 analyzes whether there is an abnormal sound based on the operation history. For example, the first analysis unit 301 may determine an abnormal sound threshold (notification threshold T) based on input information provided from an input processing unit 303 and then analyze whether a sound level (abnormal sound level N) obtained from the operation history is greater than or equal to the abnormal sound threshold. A notification unit 305 transmits a result of the analysis of the first analysis unit 301 to the monitoring tool 260 or the printer 100.

A second analysis unit 302 analyzes whether the result of analysis of the first analysis unit 301 is reliable. For example, the second analysis unit 302 may compute a confidence C of the analysis result based on the operation history and the input information. If the confidence C is low (e.g., if the confidence C is less than a threshold), a requesting unit 304 transmits, to the monitoring tool 260 or the printer 100, a message requesting for re-input or supplementation of the input information.

A display control unit 361 of the monitoring tool 260 displays the analysis result and the message on the display apparatus of the operation unit 89. A response unit 362 accepts input of information necessary for setting the notification threshold T via the input apparatus of the operation unit 89 and displays the input information on the input processing unit 303.

The input processing unit 303 stores the input information in the storage apparatus 86 and provides the input information to the first analysis unit 301 and the second analysis unit 302. The first analysis unit 301 updates the notification threshold T based on the new input information and then analyzes the operation history again based on the updated notification threshold T.

Figure 5:
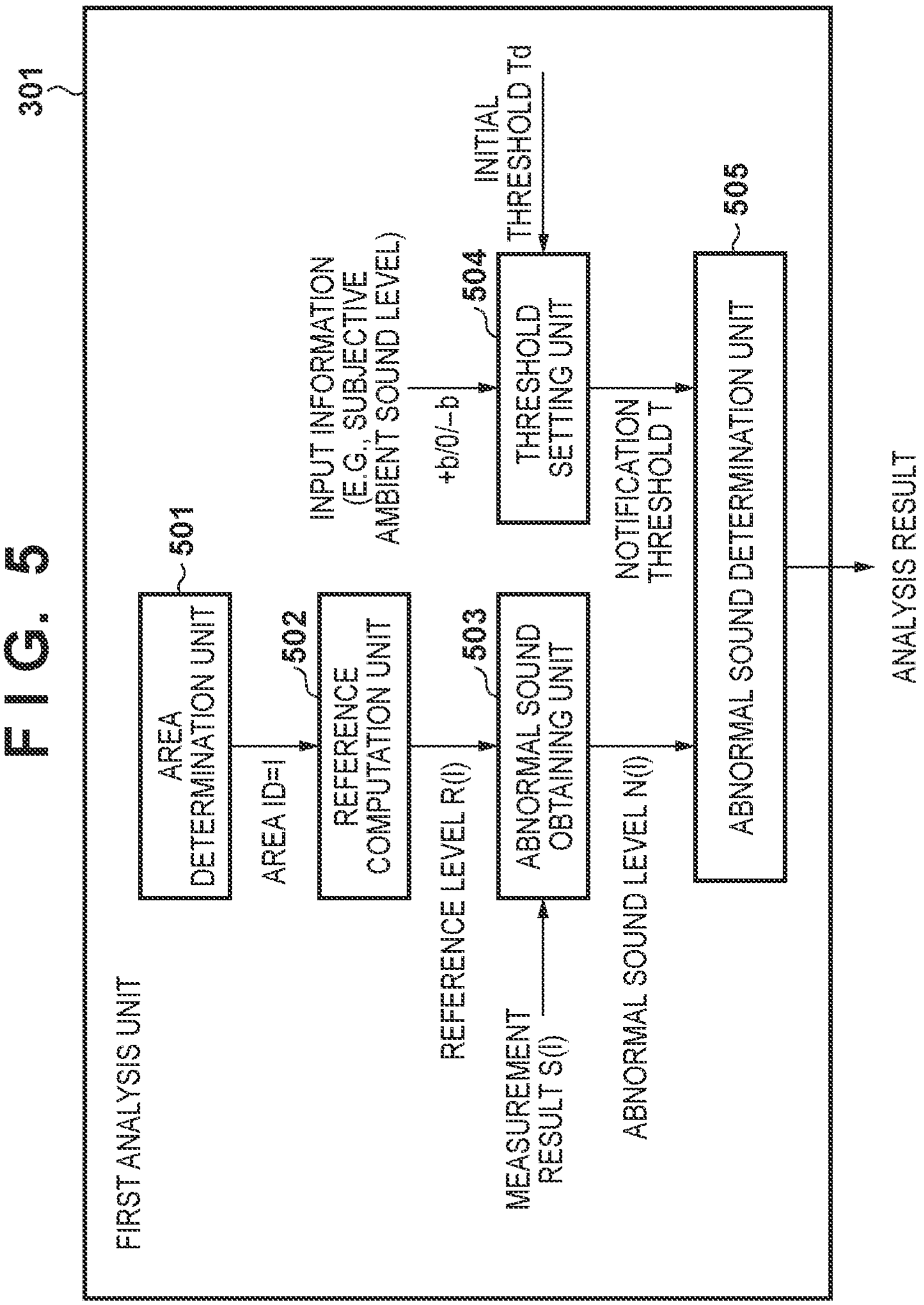
FIG. 5 is a diagram for explaining a first analysis unit.

FIG. 5 illustrates details of the first analysis unit 301. In the first embodiment, the interior of the printer 100 is managed by being logically divided into a plurality of areas. The areas are spatial regions or scopes that are set for identifying an abnormal sound generation source.

As illustrated in FIG. 6A, the plurality of areas include, for example, a feeding area, a print area, and a fixing area. The feeding area is an area in which rotating members (e.g., the feeding roller, the conveyance roller, and the registration roller) driven by the motor M1 are arranged. The print area is an area in which rotating members (e.g., the photosensitive drums 1K, 1Y, 1M, and 1C) driven by the motors M2 and M3 are arranged. The fixing area is an area in which rotating members (e.g., the pressing roller and the fixer) driven by the motor M4 are arranged.

An area determination unit 501 references the actuator information registered in the operation history and determines which area's actuator has been operating. For example, the area determination unit 501 outputs an area ID, which is identification information of the area in which the actuator is operating. Hereinafter, the area ID is represented by a variable I. It is possible to distinguish, based on the area ID, a sound level obtained when an actuator is operating alone.

A reference computation unit 502 obtains a reference level R(I), which is used for obtaining the abnormal sound level N, for each area based on the operation history. For example, the reference level R(I) may be an average value of X sound levels obtained at the start of measurement. For example, X=5. The reference level R(I) is stored in the storage apparatus 86. The start of measurement is, for example, when the printer 100 is installed in a user environment, when the notification threshold T is set, when a first record of the operation history is obtained, or the like. The reference level R(I) is obtained from a sound level measured when an actuator arranged in an I-th area of the plurality of areas is operating alone.

An abnormal sound obtaining unit 503 obtains an abnormal sound level N(I) based on a measurement result S(I) and the reference level R(I) of a sound level. The measurement result S(I) may be an average value of Y sound levels most recently measured. For example, Y=5. The measurement result S(I) is obtained from a sound level measured when an actuator arranged in the I-th area of the plurality of areas is operating alone. The abnormal sound level N(I) of the I-th area is calculated, for example, by the following equation.

$$N(I)=S(I)-R(I) \qquad \text{Eq. 1}$$

FIG. 6B illustrates an example of calculation of the reference level R(I) and the abnormal sound level N(I). These are obtained for each area from the operation history illustrated in FIG. 4.

An abnormal sound determination unit 505 determines whether there is an abnormal sound for each area based on the calculated abnormal sound level N(I) and the notification threshold T set by a threshold setting unit 504. If the abnormal sound level N(I) is greater than or equal to the notification threshold T, the abnormal sound determination unit 505 determines that an abnormal sound is occurring in the I-th area. If the abnormal sound level N(I) is less than the notification threshold T, the abnormal sound determination unit 505 determines that an abnormal sound is not occurring in the I-th area.

The notification unit 305 may transmit a message (analysis result) explicitly indicating an abnormal sound generation source to the monitoring tool 260. The message may include text prompting the administrator or the like to confirm an area identified as the abnormal sound generation source. For example, a message may include text, such as "an abnormal sound may be occurring in a fixing area". In order to eliminate the abnormal sound, it may be necessary to replace a component. In such a case, an administrator or the like may recognize a component that needs to be replaced from a message displayed on the operation unit 89 and place an order for that component.

Incidentally, the threshold setting unit 504 determines the notification threshold T based on an initial threshold Td and input information. For example, Td=80. The input information is obtained by the response unit 362 and the input processing unit 303.

FIG. 7 illustrates an example of a UI 700 to be displayed on the operation unit 89. UI is an abbreviation for user interface. The UI 700 is displayed when the printer 100 is installed and when a confidence of an analysis result is low. The UI 700 includes a message asking the user (e.g., the administrator) about a running sound of the printer 100. A response may be inputted in a multiple-choice format. Radio buttons 701 are buttons for the user to select their opinion (e.g., distracting, normal, not distracting) related to a magnitude of the running sound. A response button 702 is a button for instructing transmission of the response selected by the user to the server control unit 201 as input information. Here, the running sound of the printer 100 is employed; however, input information may be generated for an ambient sound in an installation environment of the printer 100.

FIG. 6C is a table illustrating a relationship between input information and a threshold correction value b. The table is held in the storage apparatus 86. If the input information is "distracting", the correction value b is −5. If the input information is "normal", the correction value b is 0. If the input information is "not distracting", the correction value b is +5. When the installation environment of the printer 100 is an environment in which the running sound is distracting for the user, the environment is that in which an abnormal sound is noticeable. Therefore, the notification threshold T is corrected or updated such that abnormal sound occurrence is notified early.

$$T=Td+b \quad \text{Eq. 2}$$

If the initial threshold Td is 80 and the correction value b is −5 (distracting), the threshold T is 75. Therefore, a maintenance notification is issued at an earlier stage.

Figure 8:
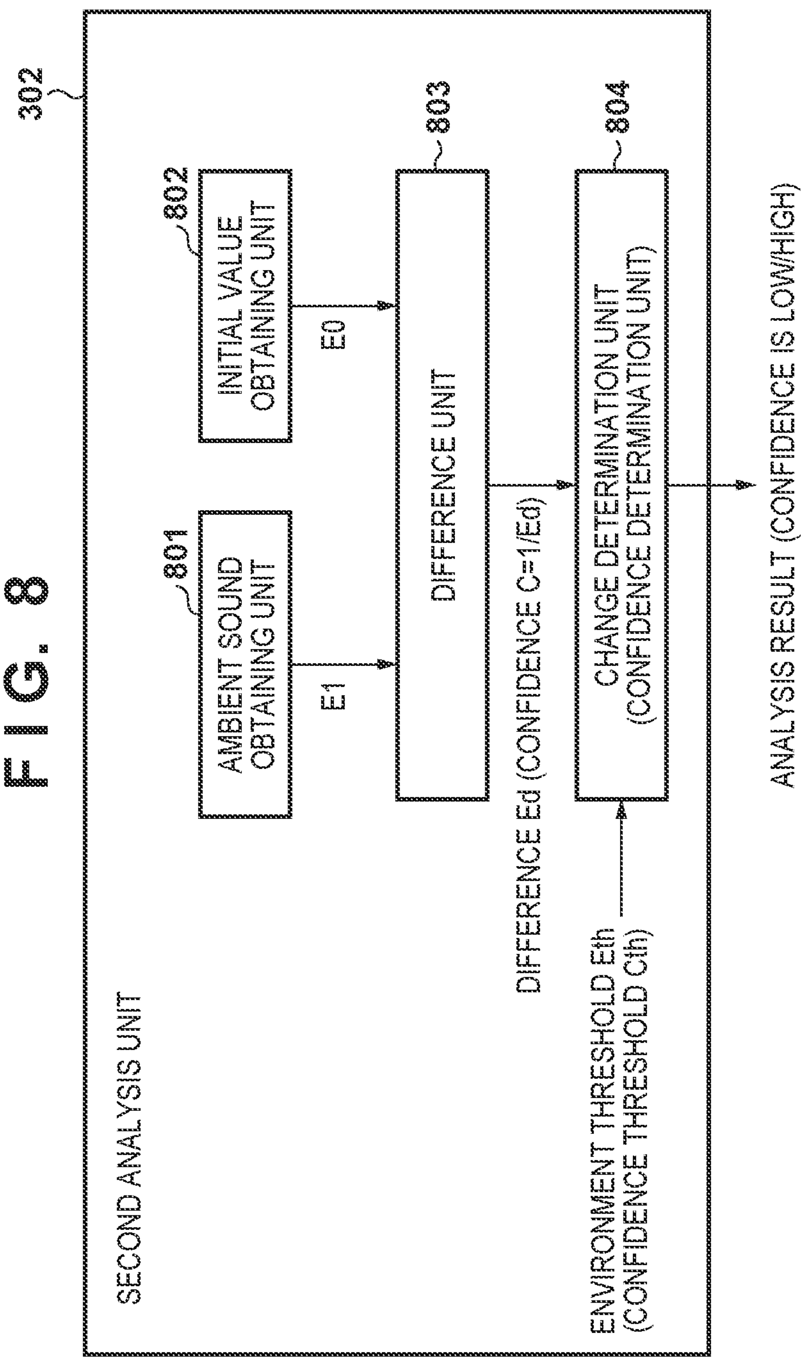
FIG. 8 is a diagram for explaining a second analysis unit.

FIG. 8 illustrates details of the second analysis unit 302. The second analysis unit 302 calculates the confidence C of an analysis result outputted from the first analysis unit 301. An ambient sound obtaining unit 801 obtains a sound level obtained when all actuators are not operating from the operation history as a current ambient sound level E1. In the operation history illustrated in FIG. 4, a sound level of a record in which "none" is described in an actuator column is obtained as the ambient sound level E1. The ambient sound level E1 may be an average value of Y ambient sound levels obtained in the most recent period.

An initial value obtaining unit 802 obtains, from the operation history, an initial value E0 of an ambient sound level obtained when the printer 100 is installed. The initial value E0 may be an average value of X ambient sound levels obtained when the printer 100 is installed. The initial value E0 may be an ambient sound level obtained when input information is inputted. The initial value E0 may thus be updated.

A difference unit 803 obtains a difference Ed between the current ambient sound level E1 and the initial value E0.

$$Ed=E1-E0 \quad \text{Eq. 3}$$

The confidence C may be obtained from the following equation, for example.

$$C=1/Ed \quad \text{Eq. 4}$$

The greater the difference Ed, the greater the change in the ambient sound level. That is, it is likely that the installation environment has changed. For example, the printer 100 may have been relocated from a noisy environment to a quiet environment. This suggests that a likelihood of a running sound being distracting at a time at which the input information had been collected is different from the current likelihood of a running sound being distracting. If the first analysis unit 301 obtains an analysis result by using the previous notification threshold T, the analysis result will not reflect the current likelihood of a running sound being distracting for the user. Therefore, the confidence C of the analysis result decreases, and thus, a maintenance notification will be issued at an inappropriate timing.

Therefore, if the difference Ed is greater than or equal to an environment threshold Eth, a change determination unit (confidence determination unit) 804 determines that the confidence C of the analysis result is low. That is, if the confidence C is less than a confidence threshold Cth, the change determination unit 804 determines that the confidence C is low. If the difference Ed is less than the environment threshold Eth, the change determination unit 804 determines that the confidence C is high. That is if the confidence C is greater than or equal to the confidence threshold Cth, the change determination unit 804 determines that the confidence of the analysis result is high. The environment threshold Eth is set to 80, for example.

As described above, in the first embodiment, an inconsistency occurring between input information that indicates a likelihood of a running sound being distracting and a measurement result of an ambient sound may be defined as a "decrease in confidence" of an analysis result. In the first embodiment, when the difference Ed is greater than or equal to the environment threshold Eth and an environment in which one has previously responded "distracting" changes to a noisier environment, the notification threshold T may be inappropriate. Therefore, the second analysis unit 302 may determine that the analysis result is "unreliable". When the confidence C is low, the requesting unit 304 transmits a message requesting input of input information to the monitoring tool 260. The input information is thus updated, and thereby, the notification threshold T is corrected to an appropriate value.

For example, if the input information is "not distracting", the correction value b is determined to be +5, as illustrated in FIG. 6C. Therefore, the corrected notification threshold T is 85. That is, the notification threshold T suitable for the current installation environment is set in the first analysis unit 301. As a result, a timing at which a maintenance notification is issued is optimized, and a component will thus be replaced at an appropriate timing. In addition, unnecessary service dispatch will be suppressed.

[Flowchart]

(1) Printer 100

Figure 9:
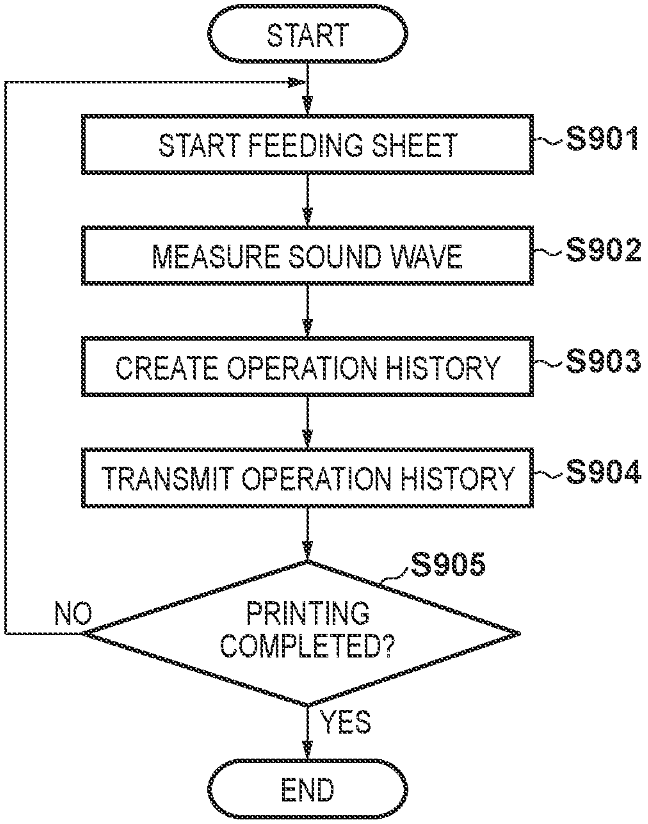
FIG. 9 is a flowchart for explaining a method of creating an operation history.

FIG. 9 is a flowchart for explaining a control method to be executed by the CPU 80 of the engine control unit 216. Upon receiving a print instruction, the CPU 80 performs the following processing according to a program.

In step S901, the CPU 80 (driving unit 311) drives the motors M1 to M4 according to the print instruction and starts feeding of a sheet S. The driving unit 311 creates actuator information and stores the actuator information in the storage apparatus 81.

In step S902, the CPU 80 (conversion unit 313) measures a sound wave by controlling the sound collector 71. The conversion unit 313 creates measurement information, which includes a measurement date and time and a sound wave level, and stores the measurement information in the storage apparatus 81.

In step S903, the CPU 80 (creation unit 312) creates an operation history based on the actuator information and the measurement information. As illustrated in FIG. 4, the operation history includes the measurement date and time, the actuator, and the sound level.

In step S904, the CPU 80 (transmission unit 314) transmits the operation history to the server apparatus 200. The operation history is transmitted when a predetermined transmission condition is satisfied. The transmission condition may be any of a request from the server apparatus, one operation history record being obtained, a predetermined time being reached, and the like.

In step S905, the CPU 80 determines whether printing has been completed. When an image has been formed on all sheets S based on the print instruction, the CPU 80 determines that printing has been completed. If printing has not been completed, the CPU 80 advances the processing to step S901.

(2) Server Apparatus 200

Figure 10A:
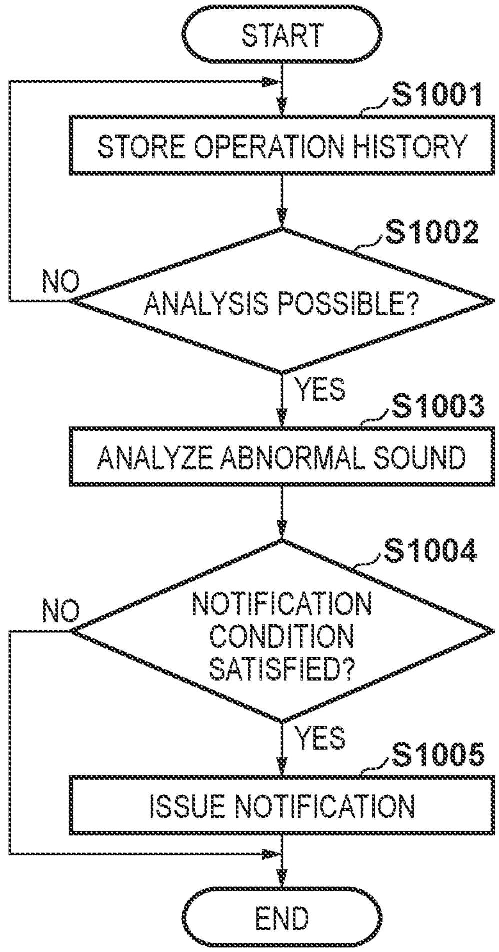
FIGS. 10A and 10B are flowcharts for explaining an analysis method.

FIG. 10A is a flowchart for explaining an abnormal sound notification method (first analysis method) to be executed by the CPU 85 of the server apparatus 200 according to a program.

In step S1001, the CPU 85 stores the operation history that has been transmitted from the engine control unit 216 in the storage apparatus 86.

In step S1002, the CPU 85 (first analysis unit 301) determines whether the operation history can be analyzed. For example, the first analysis unit 301 determines whether the number of records of operation history stored in the storage apparatus 86 is greater than or equal to a number (e.g., five) at which analysis is possible. If analysis is not possible, the CPU 85 advances the processing to step S1001. If analysis is possible, the CPU 85 advances the processing to step S1003.

In step S1003, the CPU 85 (first analysis unit 301) reads out the operation history from the storage apparatus 86 and then analyzes an abnormal sound based on the operation history. For example, the first analysis unit 301 obtains the abnormal sound level N(I) and then determines whether there is an abnormal sound by comparing the abnormal sound level N(I) and the notification threshold T. If the notification threshold T is 75 and the abnormal sound level N(I) is 80, the CPU 85 determines that there is an abnormal sound.

In step S1004, the CPU 85 (the first analysis unit 301 or the notification unit 305) determines whether a notification condition is satisfied based on a result of the analysis. If the analysis result suggests occurrence of an abnormal sound, the CPU 85 determines that the notification condition is satisfied. If the analysis result does not suggest occurrence of an abnormal sound, the CPU 85 determines that the notification condition is not satisfied. If the notification condition is satisfied, the CPU 85 advances the processing to step S1005. If the notification condition is not satisfied, the CPU 85 skips step S1005.

In step S1005, the CPU 85 (notification unit 305) issues a notification to the client apparatus 250 and the monitoring tool 260. The notification may include text, such as "an abnormal sound may be occurring in the fixing area". The notification may include text, such as "the fixer needs to be replaced". The notification may include text, such as "the pressing roller needs maintenance". The notification is a notification about a maintenance of the image forming apparatus. These notifications may be called maintenance notifications.

Figure 10B:
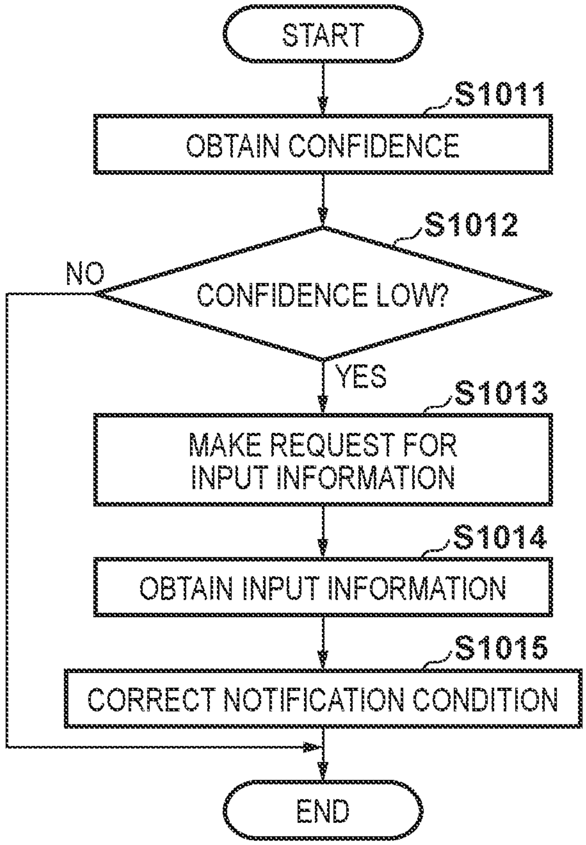

FIG. 10B is a flowchart for explaining a notification condition correction method (second analysis method) to be executed by the CPU 85 of the server apparatus 200 according to a program. The notification condition correction method and the abnormal sound notification method need not be executed in synchronization. For example, the correction method may be performed each time an operation history is received.

In step S1011, the CPU 85 (second analysis unit 302) obtains the confidence C (difference Ed) of the analysis result based on the operation history or the like.

In step S1012, the CPU 85 (second analysis unit 302) determines whether the confidence C is low. If the confidence C is less than the threshold Cth, the second analysis unit 302 determines that the confidence C is low. If the confidence C is greater than or equal to the threshold Cth, the second analysis unit 302 determines that the confidence C is high. If the confidence C is low, the CPU 85 advances the processing to step S1013. If the confidence C is high, the CPU 85 ends the correction method.

In step S1013, the CPU 85 (requesting unit 304) makes a request for input information to the monitoring tool 260. As a result, the UI 700 is displayed on the monitoring tool 260.

In step S1014, the CPU 85 (input processing unit 303) obtains input information from the monitoring tool 260. That is, a response inputted via the UI 700 is obtained.

In step S1015, the CPU 85 (threshold setting unit 504) corrects the notification conditions based on the newly-obtained input information. For example, the threshold setting unit 504 corrects the notification threshold T, which is one of the notification conditions, by using the correction value b corresponding to the newly-obtained input information.

(3) Monitoring Tool 260

Figure 11:
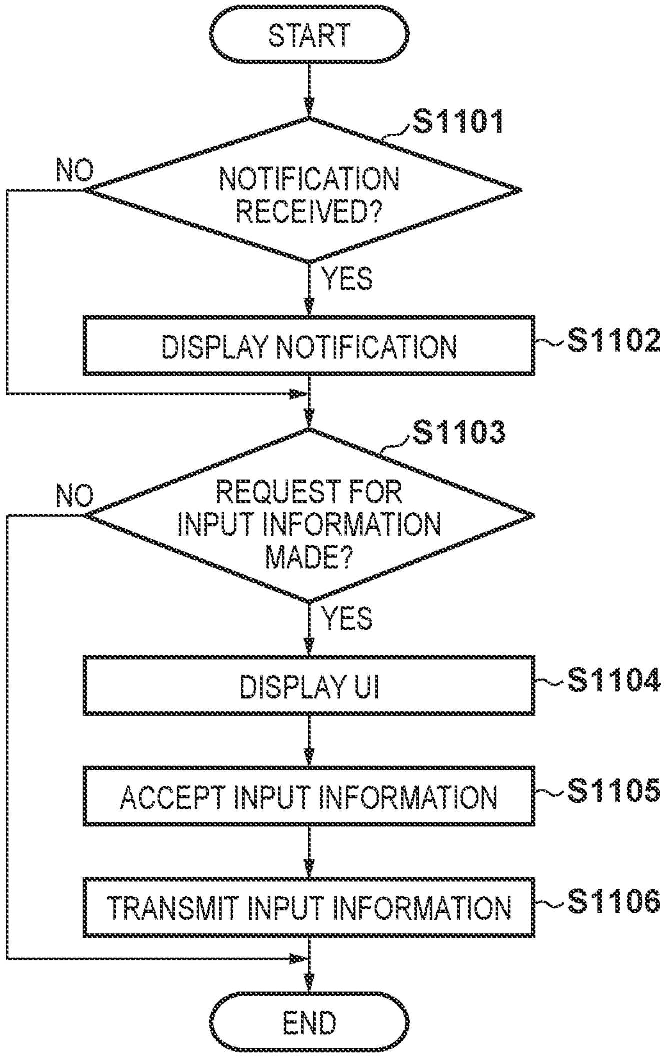
FIG. 11 is a flowchart for explaining a method of displaying a notification and a UI.

FIG. 11 is a flowchart for explaining display of a notification and transmission of input information to be executed by the CPU 87 of the client apparatus 250 according to a program. That is, FIG. 11 indicates the operation of the monitoring tool 260.

In step S1101, the CPU 87 (display control unit 361) determines whether a notification has been received from the server apparatus 200. Upon receiving a notification, the CPU 87 advances the processing to step S1102. If a notification is not received, the CPU 87 advances the processing to step S1103.

In step S1102, the CPU 87 (display control unit 361) displays the notification received from the server apparatus 200 on the display apparatus of the operation unit 89.

In step S1103, the CPU 87 (display control unit 361) determines whether a request for input information has been made by the server apparatus 200. Upon a request for input information, the CPU 87 advances the processing to step S1104. If a request for input information is not made, the CPU 87 terminates the processing indicated in FIG. 11.

In step S1104, the CPU 87 (display control unit 361) displays the UI 700 on the display apparatus of the operation unit 89.

In step S1105, the CPU 87 (response unit 362) accepts input information inputted via the UI 700. The response unit 362 creates input information according to which of the three radio buttons 701 has been pressed.

In step S1106, the CPU 87 (response unit 362) transmits the input information to the server apparatus 200. The response unit 362 transmits the input information when the response button 702 is pressed.

In the first embodiment, the printer 100 is divided into a plurality of areas (feeding area, print area, and fixing area). A sound level for when an actuator installed in that area is operating alone is obtained. An abnormal sound level is obtained from the sound level. When an abnormal sound level in a certain area exceeds a notification threshold, it is determined that an abnormal sound is occurring in that area and thus maintenance is necessary. The notification threshold may be determined according to a noticeability (the running sound is distracting/neither/not distracting) of a running sound of the printer 100 inputted by an inputter (e.g., the user or an administrator). The inputter inputs the noticeability of the running sound at the time of installation of the printer 100 or the like. That is, the noticeability of the running sound at the time of determination of the notification threshold is inputted.

In the first embodiment, the confidence C of an analysis result is obtained. When the confidence C is low, the CPU 85 causes the user to input the noticeability of the running sound and updates the notification threshold. Specifically, in the first embodiment, in order to determine the confidence C, an ambient sound is measured when none of the actuators is operating. The current ambient sound level may be significantly different from the ambient sound level at the time of installation (when the threshold has been set). In this case, it is estimated that a large environmental change has occurred. That is, it is estimated that the confidence C of the notification threshold T, which is the basis of the analysis, has decreased. Thus, the CPU 85 asks the user again for the noticeability of the running sound and updates the notification threshold T based on a result of the query. As a result, a timing at which a maintenance notification is issued may be more appropriate.

A target of the analysis need only be an operation history and thus is not limited to the abnormal sound. For example, a timing at which the sheet S is detected by the sheet sensor 27 may be analyzed. In such a case, the sheet sensor 27 is provided for each area.

Figure 12:
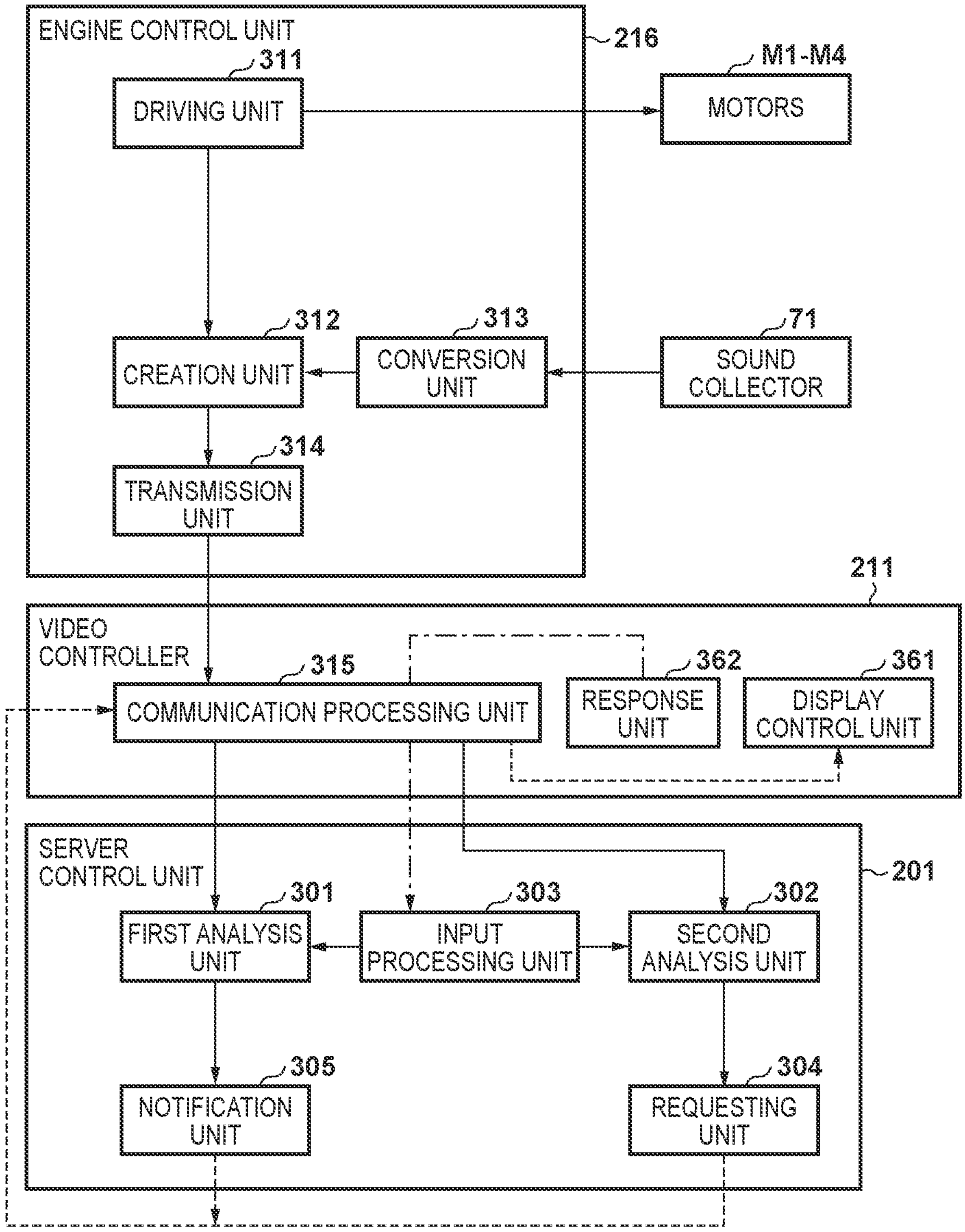
FIG. 12 is a diagram for explaining a variation.

As illustrated in FIG. 12, the display control unit 361 and the response unit 362 may be mounted in the video controller 211 of the printer 100. In this case, the display control unit 361 displays a maintenance notification and the UI 700 on the display apparatus of the operation unit 212. The response unit 362 accepts input information via the touch panel of the operation unit 212.

Second Embodiment

When an administrator executes maintenance of the printer 100, components for which maintenance has been performed and a maintenance date and time are manually inputted to the server apparatus 200 via the monitoring tool 260 or the like. If there is no maintenance history despite there being a large difference between two sound levels obtained in the most recent period in a certain area, the administrator may have neglected to input a maintenance history. In this case, the confidence C of the analysis result is low. Therefore, in a second embodiment, when the confidence C is low, the server apparatus 200 optimizes a timing at which a maintenance notification is issued by prompting the administrator or the like to input a maintenance history. The maintenance history may be information necessary for when narrowing down the cause of an abnormal sound. In the second embodiment, the same reference numerals are assigned to matters in common with the first embodiment, and descriptions thereof are invoked.

[Functions of Second Embodiment]

Figure 13:
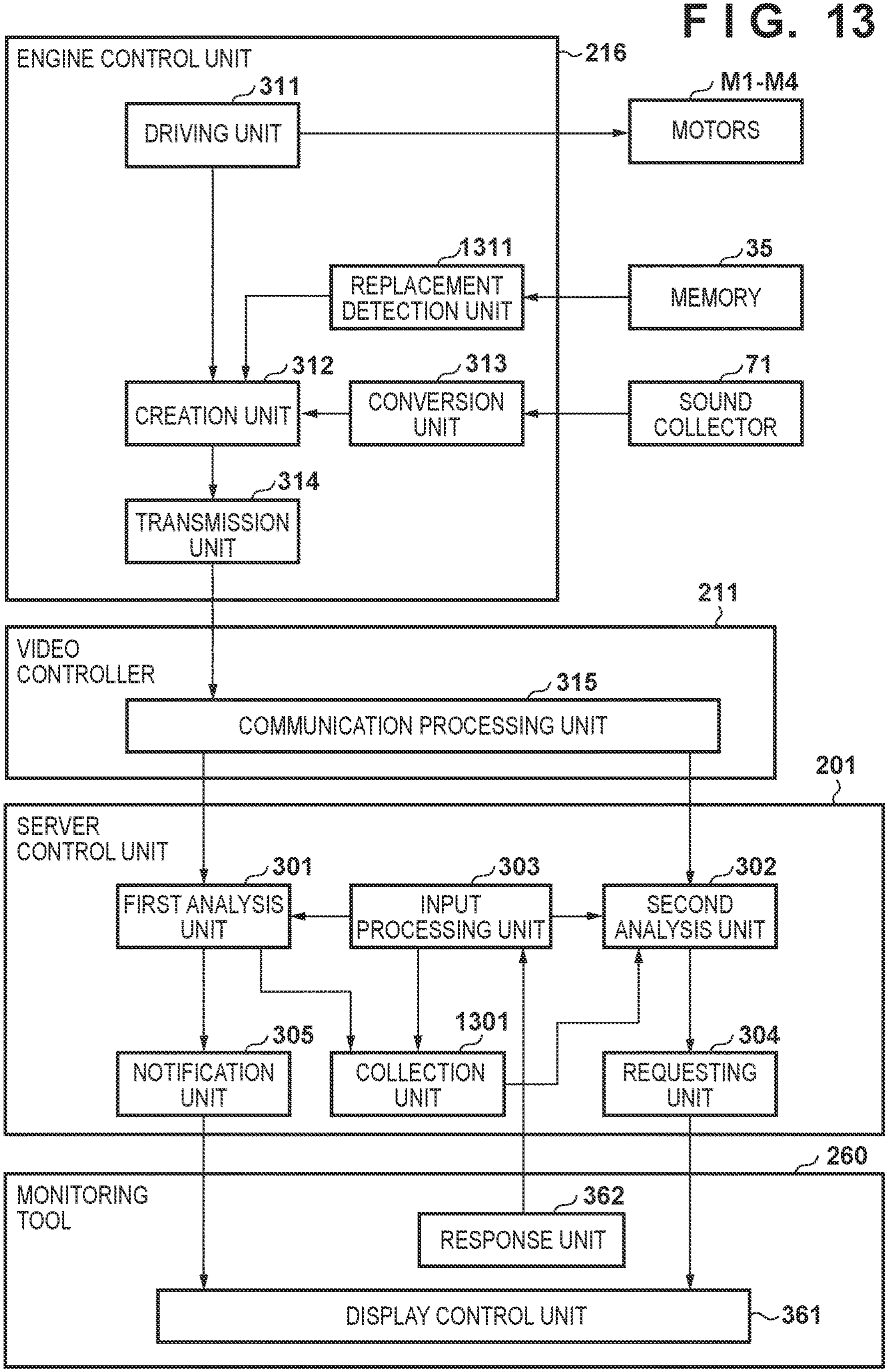
FIG. 13 is a diagram for explaining functions of the image forming system.

FIG. 13 illustrates the functions of the engine control unit 216, the video controller 211, the server control unit 201, and the monitoring tool 260 according to the second embodiment. The server control unit 201 additionally includes a collection unit 1301.

The collection unit 1301 stores the abnormal sound level N(I) for each area analyzed by the first analysis unit 301 in the storage apparatus 86 in association with a calculation date and time and an area ID (can also be an area name). FIG. 14A illustrates an analysis history of the abnormal sound level N(I) stored in the storage apparatus 86.

A replacement detection unit 1311 of the printer 100 can detect replacement of a component by reading a serial ID from the respective memories 35 of components. For example, the replacement detection unit 1311 determines that a component has been replaced when a serial ID previously read and then held in the storage apparatus 81 and a serial ID read from the memory 35 do not coincide. The creation unit 312 creates replacement information, which includes a name of a replaced component and a replacement date and time (date and time at which replacement was detected) and transmits the replacement information to the collection unit 1301 via the transmission unit 314 and the video controller 211.

FIG. 14B illustrates an example of the replacement information. In this example, the fixer 30 and the photosensitive drums 1Y, 1M, and 1C have been replaced. The collection unit 1301 stores the replacement information in the storage apparatus 81.

The input processing unit 303 collects the maintenance information (maintenance work history) of the administrator. The discharge roller pair 33 or the like is a component that cannot transmit a serial ID to the engine control unit 216. Therefore, the collection unit 1301 collects the maintenance information manually inputted by the administrator via the input processing unit 303. The maintenance information may include a name and a replacement date and time of a component replaced by the administrator. The maintenance information may include details of maintenance work (e.g., additional greasing of a component, cleaning of a component) and a date and time at which the maintenance work was executed.

Figure 15:
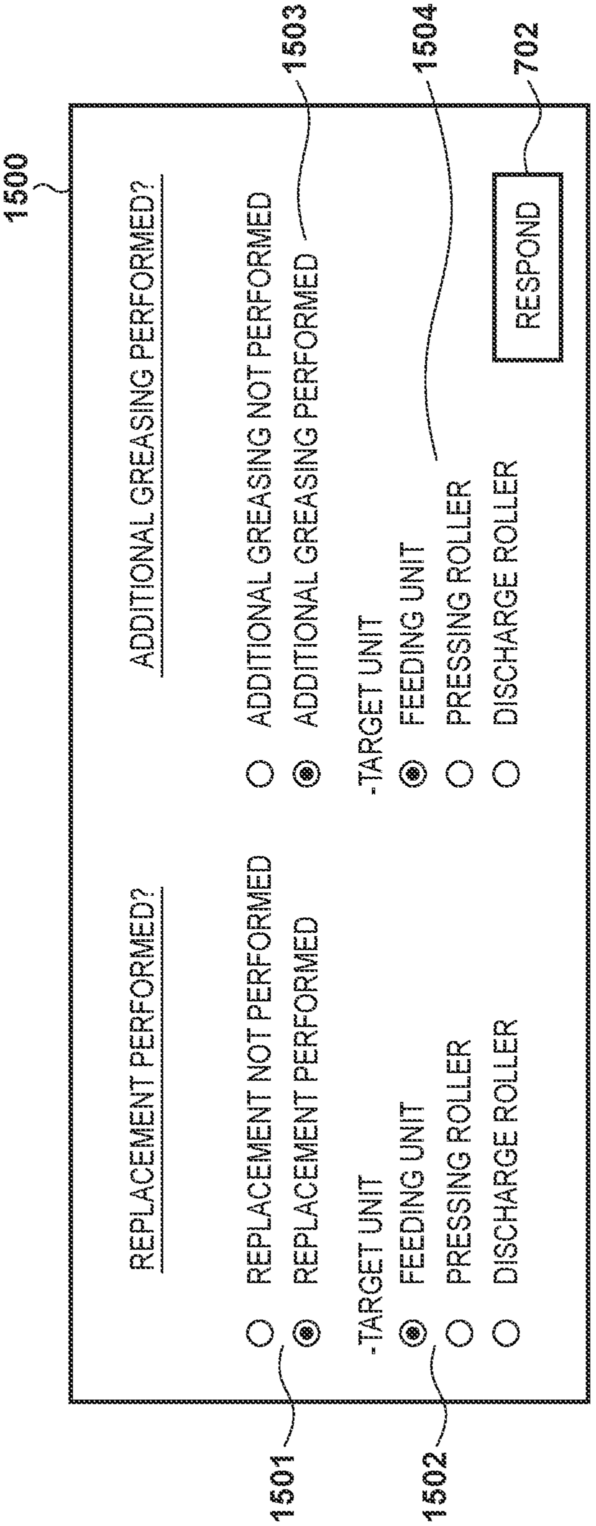
FIG. 15 is a diagram for explaining a UI.

FIG. 15 illustrates a UI 1500 to be displayed on the operation unit 89. Upon executing maintenance, the administrator calls the UI 1500, inputs maintenance information, and then transmits the maintenance information to the server apparatus 200. Radio buttons 1501 are buttons for responding to whether component replacement has been performed. Radio buttons 1502 are buttons that can be operated when component replacement has been executed and are buttons for responding with a replaced component. Radio buttons 1503 are buttons for responding to whether component maintenance has been performed. Radio buttons 1504 are buttons that can be operated when component maintenance has been executed and are buttons for responding with a component for which maintenance has been performed. When a response button 702 is pressed, the CPU 87 (the response unit 362) creates input information that includes maintenance information inputted via the UI 1500 and then transmits the input information to the server apparatus 200. The response unit 362 may attach a maintenance date and time to the maintenance information.

The input processing unit 303 and the collection unit 1301 stores the maintenance information as a maintenance work history in the storage apparatus 86. FIG. 14C illustrates an example of a maintenance work history, which includes the maintenance information. In this example, it is indicated that maintenance has been performed for the feeding unit 20. The maintenance information need not include a maintenance date and time. In this case, the input processing unit 303 may obtain, from the timer 203, a date and time at which the maintenance information was received and then add the date and time to the maintenance information.

In the second embodiment, similarly to the first embodiment, the first analysis unit 301 analyzes an abnormal sound based on the operation history. As illustrated in FIG. 14A, the first analysis unit 301 determines that an abnormal sound has occurred in the "print area" on June 4th.

In the first embodiment, although an area in which an abnormal sound is occurring is identified, a component that is an abnormal sound generation source is not identified. Therefore, in the first embodiment, a plurality of components arranged in an area in which an abnormal sound is being generated are replacement targets. If a component that is generating the abnormal sound is identified, the number of components to be replaced will be reduced, and thus maintenance cost will be reduced.

Therefore, the second analysis unit 302 identifies a component to be a target of maintenance based on an analysis result, the replacement information, and the maintenance information. Generally, a component for which maintenance has been executed is unlikely to be an abnormal sound generation source. Assume that, in an area in which an abnormal sound is being generated, there are a first component for which maintenance has been executed, a second component which has been replaced, and a third component for which neither maintenance nor replacement has been executed. In this case, the second analysis unit 302 identifies the third component as an abnormal sound generation source.

For example, from the analysis results illustrated in FIG. 14A, the replacement information illustrated in FIG. 14B, and the maintenance information illustrated in FIG. 14C, the photosensitive drum 1K is identified as the abnormal sound generation source.

As illustrated in FIG. 14D, the storage apparatus 86 may store a rule related to a maintenance date and time, which is used for identifying an abnormal sound generation source. According to this rule, if maintenance has been executed for a certain component within a period of one month before a date on which an abnormal sound has occurred, a possibility that the component is an abnormal sound generation source is low. Meanwhile, if maintenance has not been executed for a certain component within a period of one month before a date on which an abnormal sound has occurred, there is a possibility that the component is an abnormal sound generation source. That is, the second analysis unit 302 may determine whether a period from a date on which maintenance was executed or a replacement date until a date on which an abnormal sound occurred is greater than or equal to one month.

As described above, if the maintenance history (maintenance information and replacement information) has been correctly transmitted to the server apparatus 200, the server apparatus 200 can identify a source of abnormal sound generation. Meanwhile, if the maintenance history is not correctly transmitted to the server apparatus 200, the server apparatus 200 may be unable to identify a source of abnormal sound generation. Transmission of maintenance information in the maintenance history is performed manually by the administrator, and so, omission of transmission of maintenance information can easily occur.

Therefore, the second analysis unit 302 determines the confidence C of an analysis result based on the analysis history, the maintenance information, and the replacement information collected by the collection unit 1301. For example, according to the analytical history illustrated in FIG. 14A, there is a large difference Nd(I) between the abnormal sound level N1(I) of June 8th and the latest abnormal sound level N2(I) of June 4th. In this case, a possibility that maintenance (e.g., component replacement or additional greasing) or the like has been executed in the I-th area is high.

$$Nd(I)=N2(I)-N1(I) \qquad \text{Eq 0.5}$$

The second analysis unit 302 determines that maintenance has been executed when the difference Nd(I) is greater than or equal to a determination threshold Ndth. Furthermore, the second analysis unit 302 determines whether there is a maintenance history (replacement or additional greasing) of a component in a period from May 9th to June 8th. If there is no maintenance history in that period, the second analysis unit 302 determines that the confidence of the analysis result is low. If there is maintenance history in that period, the second analysis unit 302 determines that the confidence of the analysis result is high.

Figure 16:
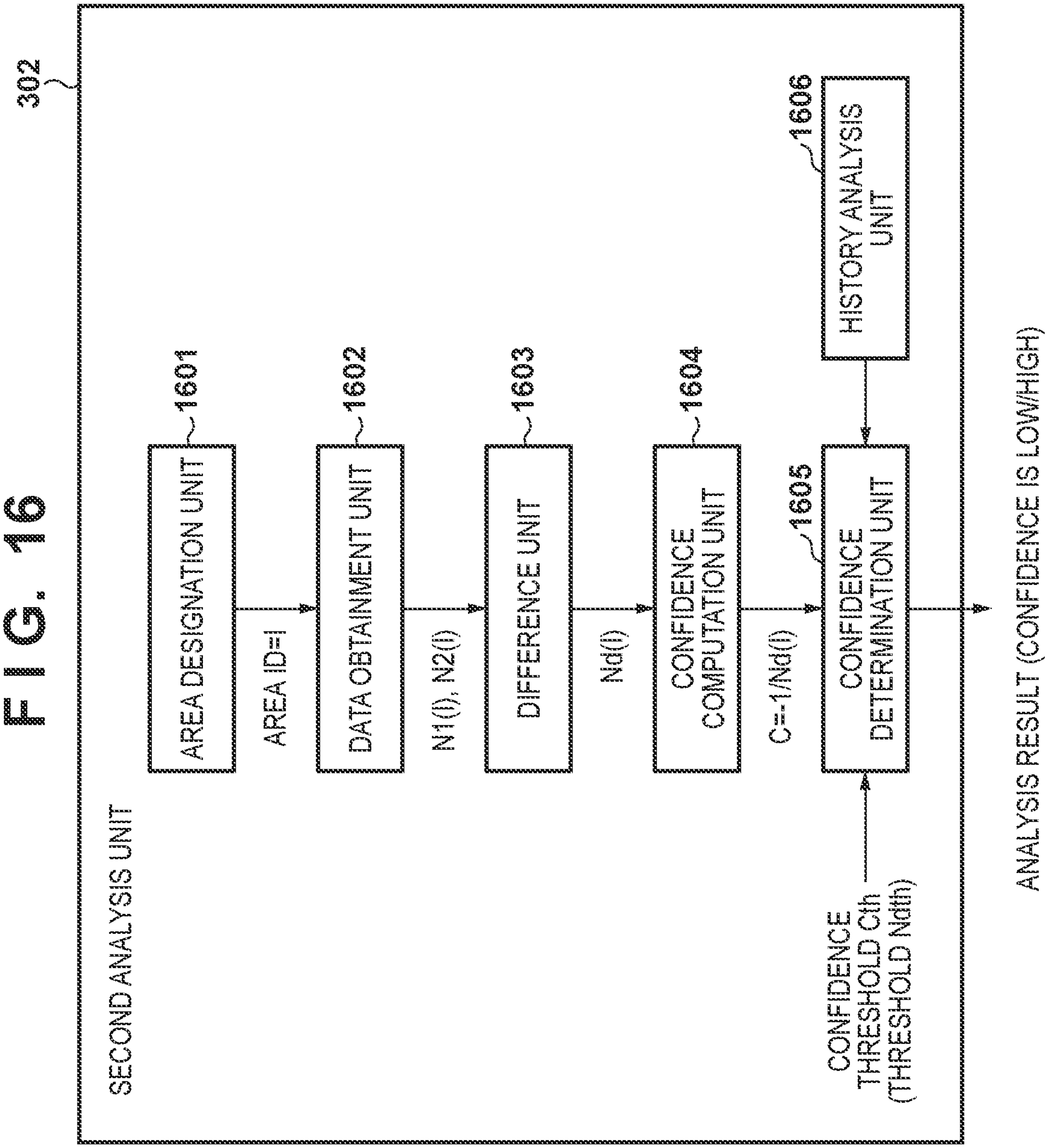
FIG. 16 is a diagram for explaining the second analysis unit.

FIG. 16 illustrates details of the second analysis unit 302 of the second embodiment. The second analysis unit 302 executes the following processing each time a record (analysis result) is added to the analysis history.

An area designation unit 1601 designates an area ID of an analysis target in a data obtaining unit 1602. A plurality of areas are designated in order or an area is identified from an added record. The data obtaining unit 1602 obtains, from the analysis history, the most recent two abnormal sound levels N1(I) and N2(I) for the designated area. A difference unit 1603 obtains the difference Nd(I) based on Equation Eq. 5.

A confidence computation unit 1604 obtains the confidence C from the difference Nd(I). For example, the confidence C may be an inverse of the difference Nd(I). In this case, the larger the difference Nd(I), the lower the confidence C. The smaller the difference Nd(I), the higher confidence C.

A history analysis unit 1606 analyzes the replacement history and the maintenance history and then determines whether maintenance has been executed within one month before a date on which the abnormal sound level N1(I) was measured.

A confidence determination unit 1605 determines whether the confidence C is greater than or equal to the confidence threshold Cth. This is equivalent to determining whether the difference Nd(I) is less than or equal to the threshold Ndth. When the confidence C is less than the confidence threshold Cth, and maintenance has not been executed within one month, the confidence determination unit 1605 determines that the confidence C is low. That is, the confidence determination unit 1605 determines that there is omission of input of maintenance information.

If the confidence C is low, the requesting unit 304 makes a request for input of maintenance information to the monitoring tool 260. In response to this request, the display control unit 361 displays an input screen on the operation unit 89.

Figure 17:
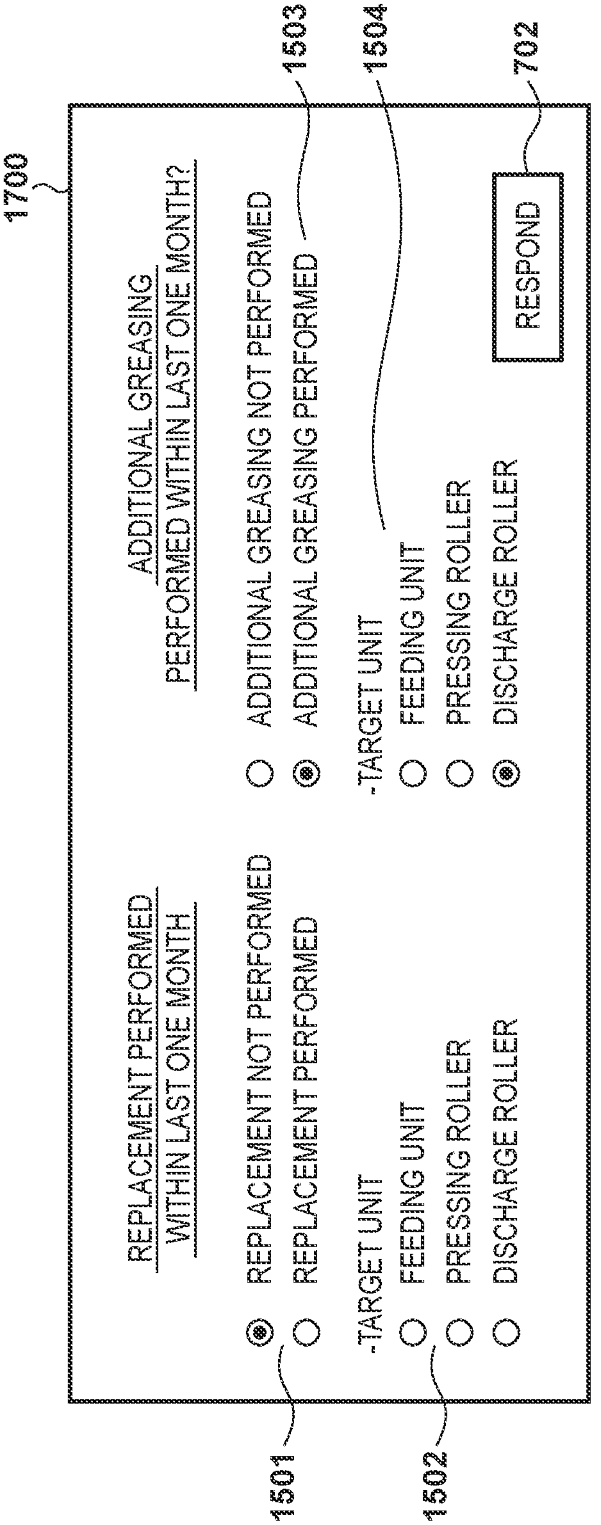
FIG. 17 is a diagram for explaining a UI.

FIG. 17 illustrates a UI 1700 for inputting maintenance information. The UI 1700 is almost identical to the UI 1500 but is a UI for prompting input of maintenance information for the past month. In this example, "additional grease has been applied to the pressing roller" is selected as a response. The input processing unit 303 adds the maintenance information inputted via the UI 1700 to the maintenance history.

Figure 18:
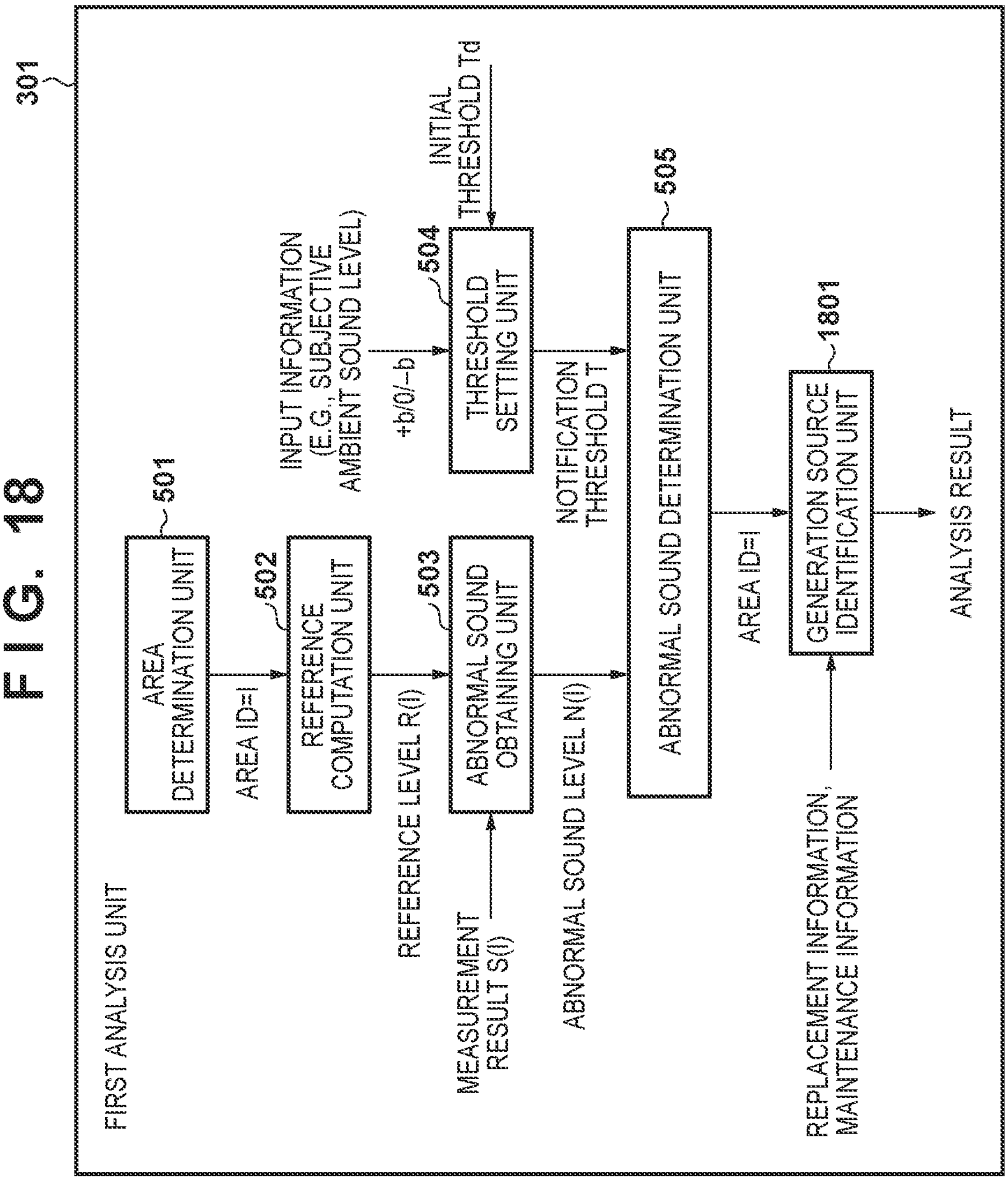
FIG. 18 is a diagram for explaining the first analysis unit.

FIG. 18 illustrates the first analysis unit 301 of the second embodiment. When an abnormal sound is detected in the fixing area, a generation source identification unit 1801 identifies an abnormal sound generation source based on the updated maintenance history (replacement information and maintenance information). The fixing area includes the fixer 30, which includes the pressing roller 32 and the discharge roller pair 33. According to the replacement history of FIG. 14B, it can be seen that the fixer 30 has been replaced. Maintenance information of the pressing roller 32 is registered in the updated maintenance work history. Therefore, the generation source identification unit 1801 identifies the discharge roller pair 33 as an abnormal sound generation source. The notification unit 305 creates a maintenance notification, which includes a message prompting replacement of the discharge roller pair 33, based on the analysis result.

[Flowchart of Second Embodiment]

(1) Printer 100

Figure 19:
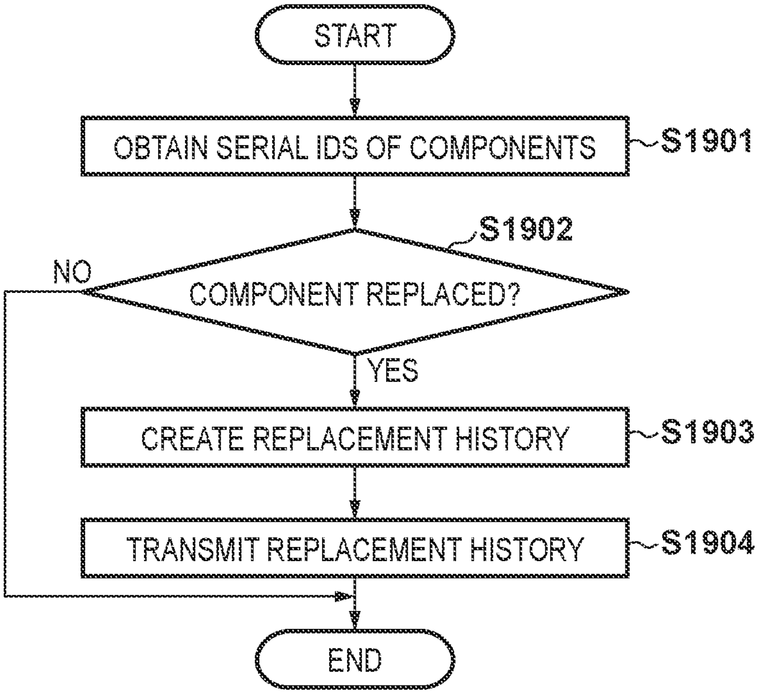
FIG. 19 is a flowchart for explaining a method of creating a replacement history.

FIG. 19 illustrates a replacement history transmission method to be executed by the CPU 80 of the engine control unit 216 according to a program. The following processing is performed for each component that supports replacement detection.

In step S1901, the CPU 80 (replacement detection unit 1311) obtains a serial ID (unique identification information) from the respective memories 35 of components.

In step S1902, the CPU 80 (replacement detection unit 1311) determines whether a component has been replaced based on the serial ID obtained from the memory 35. For example, when a serial ID stored in the storage apparatus 81 and the serial ID obtained from the memory 35 coincide, the replacement detection unit 1311 determines that the component has not been replaced. If a serial ID stored in the storage apparatus 81 and the serial ID obtained from the memory 35 do not coincide, the replacement detection unit 1311 determines that the component has been replaced. If the component has not been replaced, the CPU 80 terminates the transmission method. If the component has been replaced, the CPU 80 advances the processing to step S1903.

In step S1903, the CPU 80 (creation unit 312) creates a replacement history. The creation unit 312 obtains a replacement date and time from the timer 82 and creates a replacement history by associating the replacement date and the identification information of the replaced component.

In step S1904, the CPU 80 (transmission unit 314) transmits the replacement history to the server apparatus 200. The collection unit 1301 stores the replacement history in the storage apparatus 86.

(2) Server Apparatus 200

Figure 20A:
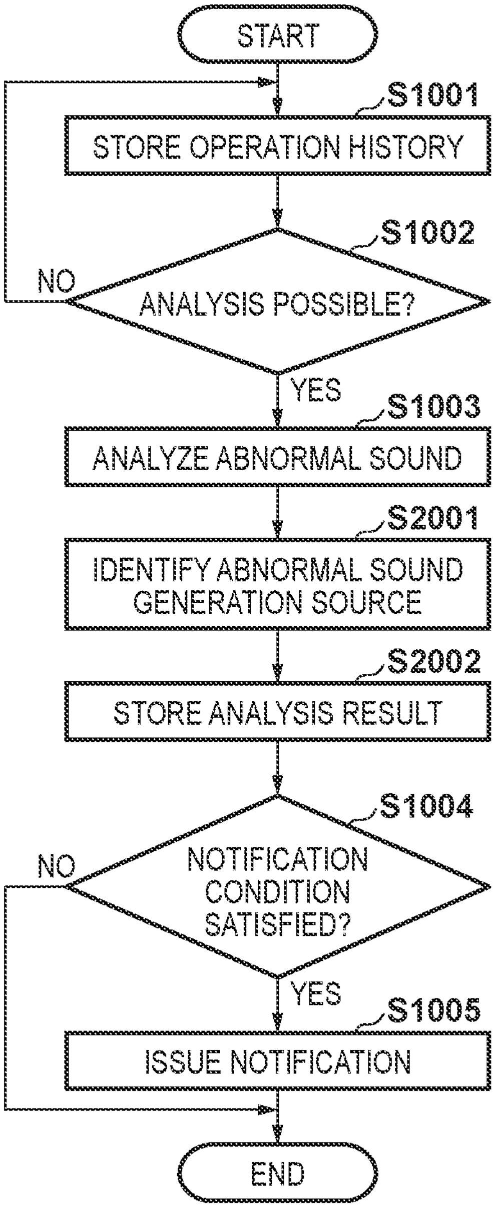
FIGS. 20A and 20B are flowcharts for explaining an analysis method.

FIG. 20A illustrates an abnormal sound analysis method to be executed by the CPU 85 of the server apparatus 200. Steps that are in common with steps of FIG. 10A are assigned the same reference numerals, and descriptions thereof are invoked. Steps S2001 and S2002 are inserted between steps S1003 and S1004.

In step S2001, the CPU 85 (generation source identification unit 1801) identifies an abnormal sound generation source (component) based on a list of components arranged in an abnormal sound generation area and the maintenance history (replacement information and maintenance information). For example, the generation source identification unit 1801 identifies one component that has not been replaced in the most recent period (e.g., one month) and for which maintenance work has not been executed as a generation source from a plurality of components arranged in the abnormal sound generation area. A name of the identified component will be included in a maintenance notification.

In step S2002, the CPU 85 (collection unit 1301) stores the analysis result in the storage apparatus 86. As a result, the analysis result is added to the analysis history, and the analysis result can be referenced from the second analysis unit 302.

Figure 20B:
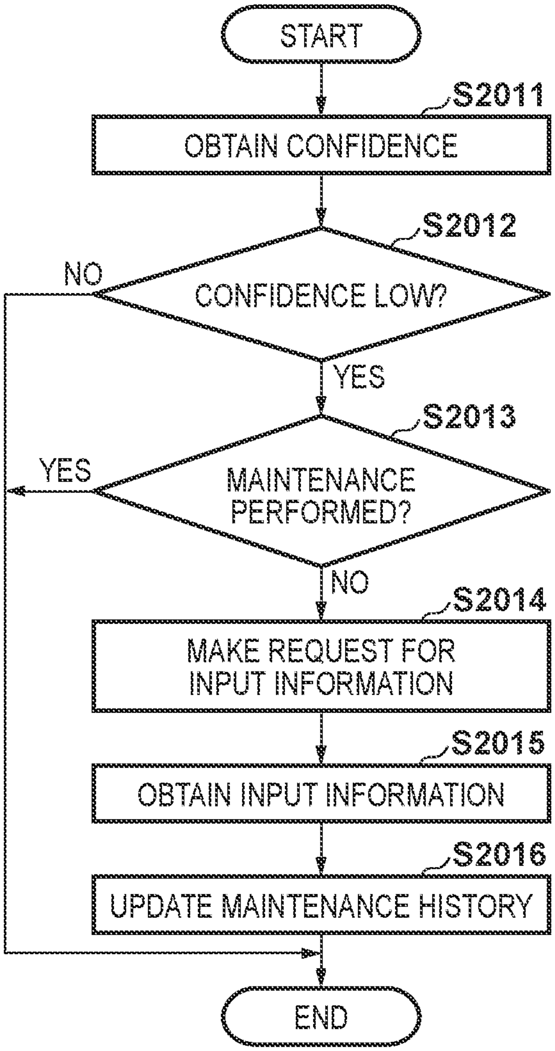

FIG. 20B illustrates a confidence analysis method to be executed by the CPU 85 of the server apparatus 200.

In step S2011, the CPU 85 (second analysis unit 302) obtains the confidence C of the analysis result based on the analysis history. The difference unit 1603 of the second analysis unit 302 obtains the confidence C from the difference Nd(I) of the most recent two abnormal sound levels in the abnormal sound generation area.

In step S2012, the CPU 85 (confidence determination unit 1605) determines whether the confidence C is low. If the confidence C is low, the CPU 85 advances the processing to step S2013.

In step S2012, the CPU 85 (confidence determination unit 1605 and history analysis unit 1606) determines whether maintenance has been performed within a predetermined period. For example, the history analysis unit 1606 analyzes the maintenance history (replacement history and maintenance work history) and then determines whether maintenance has been executed within one month before a date on which the abnormal sound level N1(I) was measured. If maintenance has been performed, the difference Nd(I) becomes large and the confidence C temporarily decreases. Therefore, the CPU 85 skips step S2014 to step S2016. Meanwhile, if there is no maintenance information and replacement information registered within the predetermined period in the maintenance history, the CPU 85 advances the processing to step S2014.

In step S2014, the CPU 85 (requesting unit 304) makes a request for input information (maintenance information) to the monitoring tool 260.

In step S2015, the CPU 85 (collection unit 1301) obtains input information (maintenance information) from the response unit 362 of the monitoring tool 260.

In step S2016, the CPU 85 (collection unit 1301) updates the maintenance history based on the maintenance information. As a result, omitted maintenance information is reflected in the maintenance history.

(3) Monitoring Tool 260

The processing of the monitoring tool 260 is as illustrated in FIG. 11. That is, in step S1104, the UI 1700 is displayed, and in step S1105, the maintenance information is obtained as the input information. In step S1106, the maintenance information is passed from the response unit 362 to the collection unit 1301 via the input processing unit 303 and then added to the maintenance history.

As described above, in the second embodiment, by estimating omission of input of maintenance information, it is possible to prompt an administrator or the like of the printer 100 to input the maintenance information. As a result, a confidence of an analysis result is improved. The omission of input of maintenance information can be estimated from a difference between two abnormal sound levels in the most recent period being large and absence of maintenance history in the most recent period.

Incidentally, when the generation source identification unit 1801 cannot narrow down the abnormal sound generation source to one component, the CPU 85 may estimate that there is omission of input of maintenance information. Also in this case, the confidence C of an analysis result is in a low state, and so, maintenance information needs to be inputted.

In the second embodiment, as illustrated in FIG. 12, the response unit 362 and the display control unit 361 may be mounted in the printer 100. That is, a maintenance notification and the UI 1700 may be displayed on the operation unit 212 of the printer 100, and maintenance information may be inputted via the operation unit 212.

Third Embodiment

In a third embodiment, the server apparatus 200 prompts an administrator or the like to input the maintenance information before the abnormal sound level N(I) exceeds the notification threshold T. For example, if the abnormal sound level N(I) exceeds a notice threshold TP, the CPU 85 determines whether an abnormal sound generation source can be identified. The notice threshold TP suggests issuing a notice of abnormal sound generation and is smaller than the initial threshold Td. If the generation source cannot be identified, the CPU 85 determines that the maintenance information is missing or insufficient and prompts the administrator or the like to input the maintenance information. When contents of the third embodiment overlap with contents of the first embodiment or the second embodiment, the contents are assigned the same reference numerals, and descriptions thereof are invoked.

[Functions of Third Embodiment]

Figure 21:
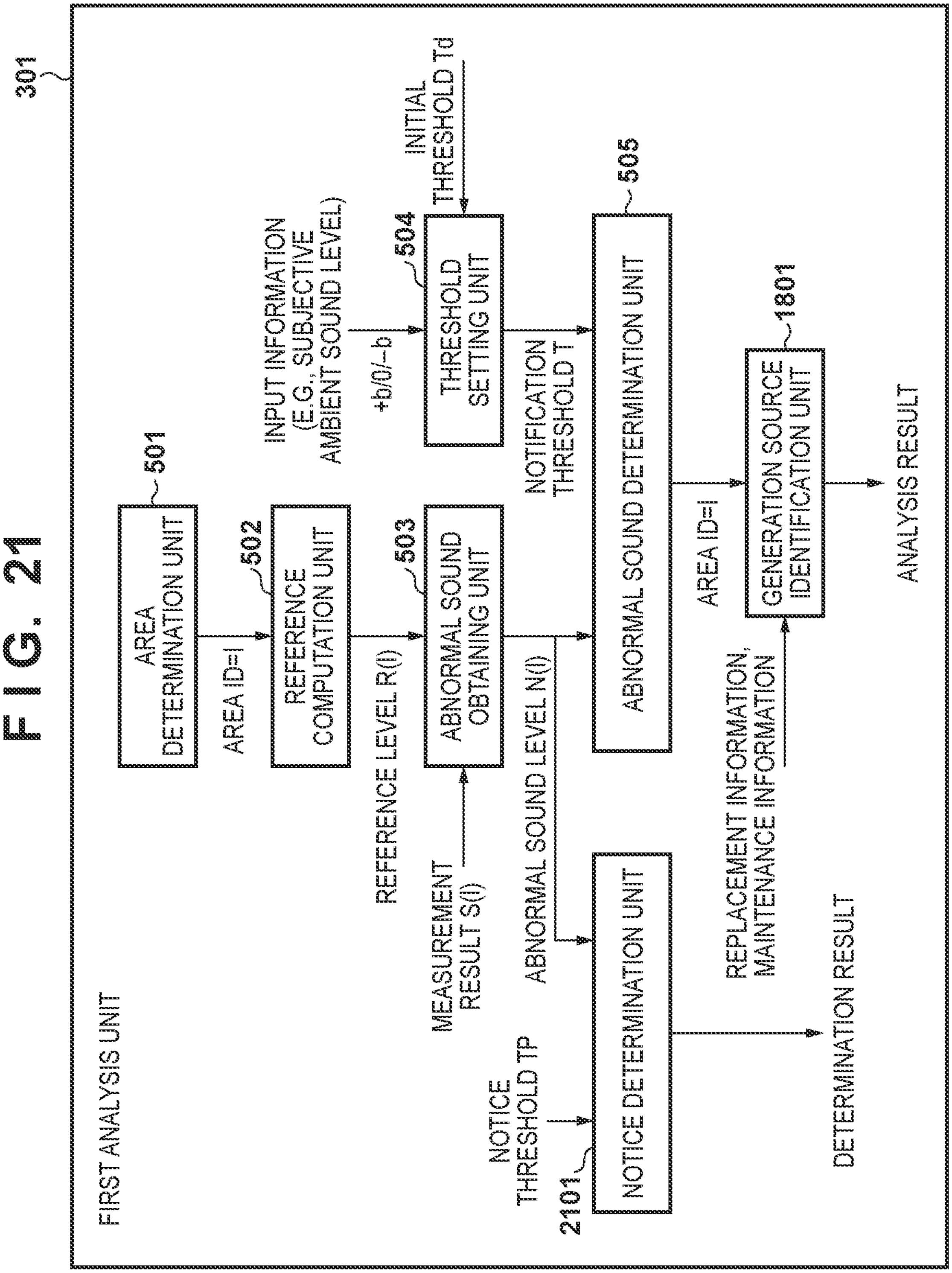
FIG. 21 is a diagram for explaining the first analysis unit.

FIG. 21 illustrates the first analysis unit 301 according to the third embodiment. A notice determination unit 2101 compares the abnormal sound level N(I) and the notice threshold TP and then outputs a comparison result (determination result). If the abnormal sound level N(I) is greater than or equal to the notice threshold TP, it is predicted that an abnormal sound will soon occur in the I-th area. The determination result is provided to the second analysis unit 302. The determination result triggers the second analysis unit 302 to execute the analysis method.

Figures 22A, 22B, 23:
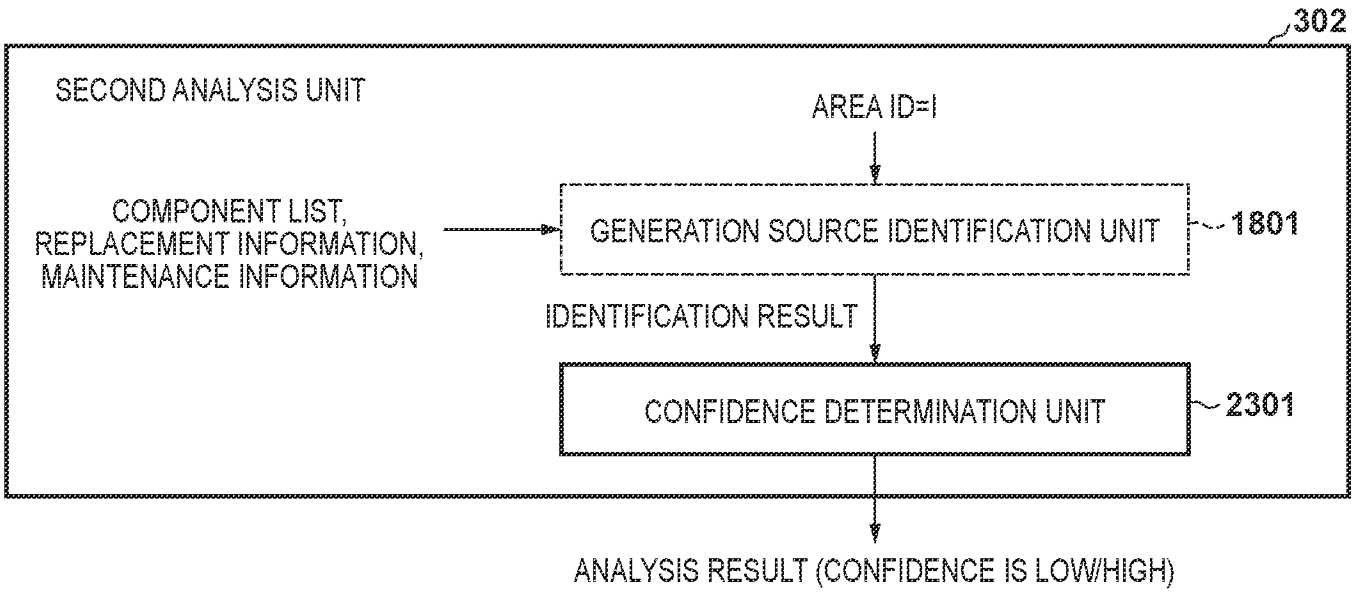
FIGS. 22A and 22B are diagrams for explaining abnormal sound analysis results and a method of determining a confidence.
FIG. 23 is a diagram for explaining the second analysis unit.

FIG. 22A illustrates abnormal sound analysis results. The abnormal sound level of the fixing area is 78. When the notice threshold TP is 75, the notice determination unit 2101 determines that an abnormal sound will soon be generated in the fixing area.

FIG. 23 illustrates the second analysis unit 302 according to the third embodiment. The generation source identification unit 1801 is provided in the first analysis unit 301 but may also be provided in the second analysis unit 302. It is sufficient so long as the first analysis unit 301 and the second analysis unit 302 can share a generation source identification result, and so, the generation source identification unit 1801 need only be mounted in at least one of the first analysis unit 301 and the second analysis unit 302.

The generation source identification unit 1801 identifies the abnormal sound generation source based on the abnormal sound analysis result (area ID indicating the abnormal sound generation area), the component list illustrated in FIG. 6A, and the maintenance history (replacement information of FIG. 14B and maintenance information of FIG. 14C). As described above, if there is omission in the maintenance history, the generation source identification unit 1801 cannot identify one component as the abnormal sound generation source. For example, if a notice that abnormal sound will occur in the fixing area is made, one component cannot be identified from the replacement information illustrated in FIG. 14B and the maintenance information illustrated in FIG. 14C. According to the component list, it can be seen that the fixer 30, the pressing roller 32, and the discharge roller pair 33 are arranged in the fixing area. According to the replacement information, it can be seen that the fixer 30 has been replaced in the most recent period. Therefore, candidates for the generation source are the pressing roller 32 and the discharge roller pair 33. However, in the most recent period, there is no maintenance history (replacement information and maintenance information) of the pressing roller 32 and the discharge roller pair 33. Therefore, the generation source identification unit 1801 cannot narrow down the abnormal sound generation source to one component.

Therefore, the confidence determination unit 2301 determines the confidence C according to the determination rule illustrated in FIG. 22B. For example, when the generation source identification unit 1801 can narrow down the abnormal sound generation source to one component, the confidence determination unit 2301 determines that the confidence C is high. For example, when the generation source identification unit 1801 cannot narrow down the abnormal sound generation source to one component, the confidence determination unit 2301 determines that the confidence C is low. If the generation source identification unit 1801 can narrow down the abnormal generation source to one component, the above-described confidence computation unit 1604 may substitute the confidence C with a high numerical value. If the generation source identification unit 1801 cannot narrow down the abnormal sound generation source to one component, the confidence computation unit 1604 may substitute the confidence C with a low numerical value. The confidence determination unit 2301 may thus determine whether the confidence C is low based on the confidence C and the confidence threshold Cth.

Figure 24:
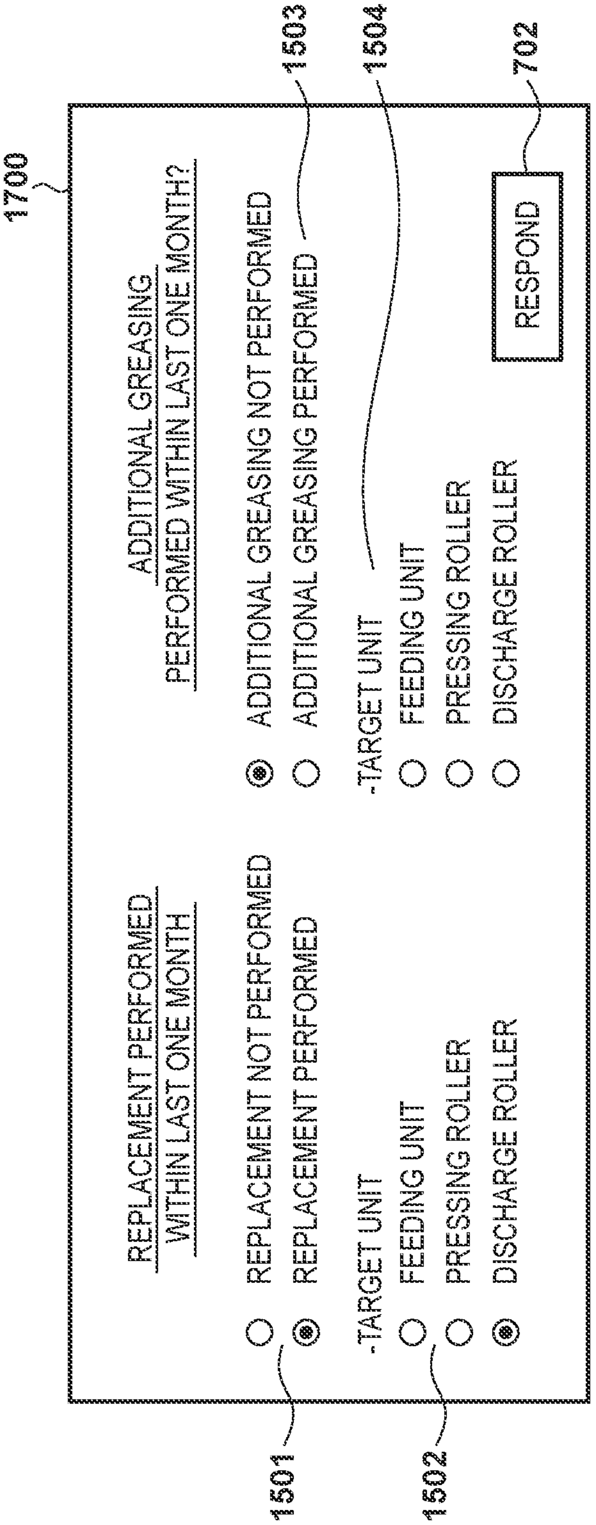
FIG. 24 is a diagram for explaining a UI.

FIG. 24 illustrates the UI 1700 to be displayed on the operation unit 89 by the requesting unit 304 and the display control unit 361 when the confidence C is low. In this example, the administrator inputs a response indicating that "the discharge rollers have been replaced" via the operation unit 89. The response unit 362 transmits a response result (replacement information) to the input processing unit 303. The input processing unit 303 or the collection unit 1301 adds the replacement information to the maintenance history held in the storage apparatus 86. This makes it possible for the generation source identification unit 1801 to identify one component as the abnormal sound generation source (e.g., pressing roller 32) by referencing the updated maintenance history.

[Flowchart of Third Embodiment]

Figure 25A:
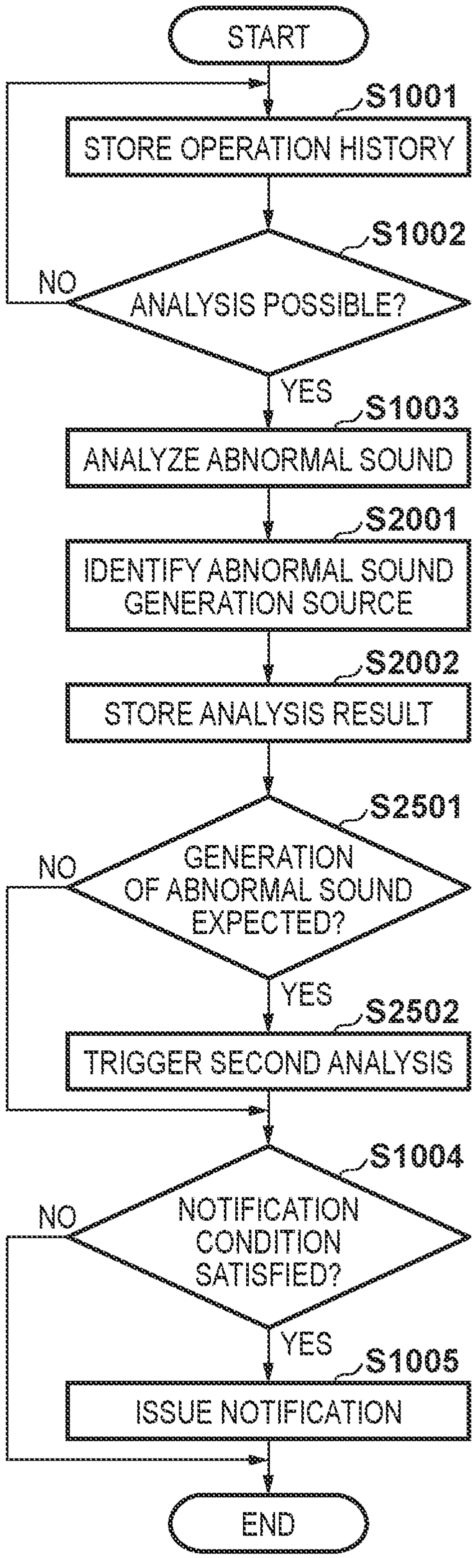
FIGS. 25A and 25B are diagrams for explaining an analysis method.

FIG. 25A illustrates an abnormal sound analysis method to be executed by the CPU 85 of the server apparatus 200. Previously-described processing is assigned the same reference numerals and the description thereof is invoked. Steps S2501 and S2502 are inserted between steps S2002 and S1004.

In step S2501, the CPU 85 (notice determination unit 2101) determines whether generation of an abnormal sound is expected. For example, the notice determination unit 2101 determines whether generation of an abnormal sound is expected based on the abnormal sound level N(I) and the notice threshold TP. If generation of an abnormal sound is not expected, the CPU 85 advances the processing to step S1004. If generation of an abnormal sound is expected, the CPU 85 advances the processing to step S2502.

In step S2502, the CPU 85 (notice determination unit 2101) triggers second analysis (confidence analysis) by the second analysis unit 302. This allows the second analysis unit 302 to start confidence analysis.

Figure 25B:
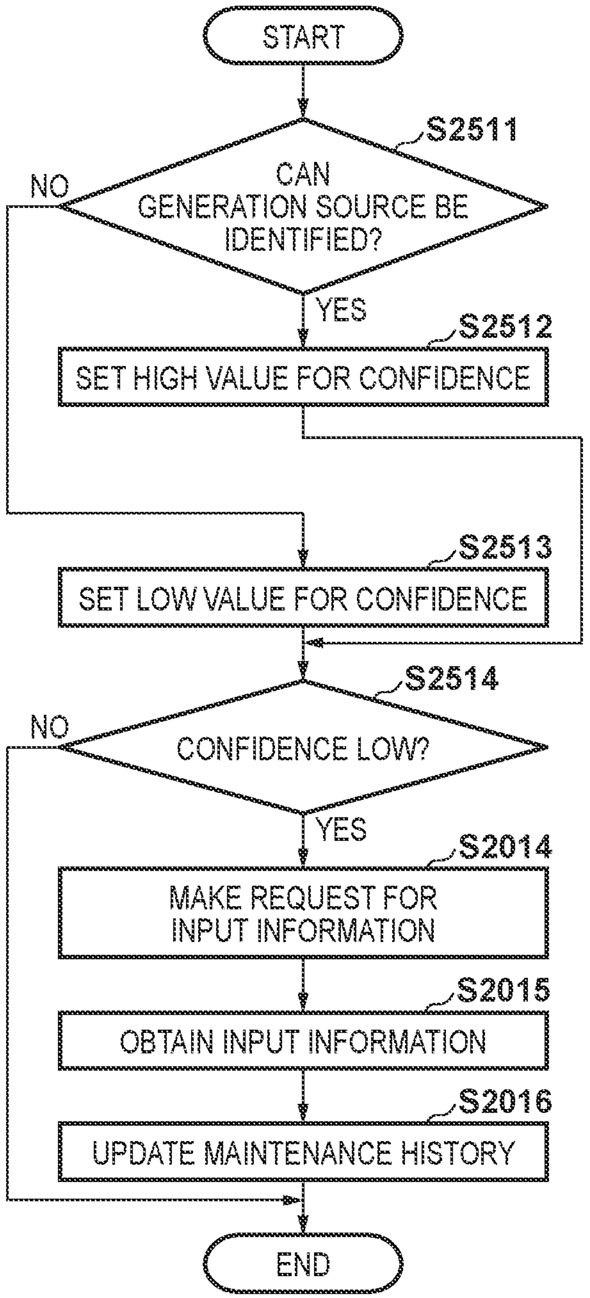

FIG. 25B illustrates a confidence analysis method to be executed by the CPU 85 of the server apparatus 200. Comparing FIG. 20B and FIG. 25B, step S2001 to step S2013 are replaced with step S2511 to step S2514. When triggered by the notice determination unit 2101, the CPU 85 (second analysis unit 302) starts the confidence analysis method.

In step S2511, the CPU 85 (confidence determination unit 2301) determines whether it is possible to identify the abnormal sound generation source based on a result of identification of the generation source identification unit 1801. For example, the confidence determination unit 2301 determines whether it is possible for the generation source identification unit 1801 to identify one component as an abnormal sound generation source from a plurality of components arranged in an area in which generation of an abnormal sound is expected. If it is possible to identify an abnormal sound generation source, the CPU 85 advances the processing to step S2512. In step S2512, the confidence determination unit 2301 sets the confidence C to a high value CH. Here, the value CH need only be higher than the determination threshold Cth.

If it is not possible to identify an abnormal sound generation source, the CPU 85 advances the processing to step S2513. In step S2513, the confidence determination unit 2301 sets the confidence C to a low value CL. The value CL need only be lower than the determination threshold Cth.

In step S2514, the CPU 85 (confidence determination unit 2301) determines whether the confidence C is low. For example, the confidence determination unit 2301 determines whether the confidence C is less than the determination threshold Cth. If the confidence C is low, the CPU 85 advances the processing to step S2014. As a result, a request for input information is made to the monitoring tool 260. If the confidence C is high, the CPU 85 terminates the analysis method without making a request for input information to the monitoring tool 260.

According to the third embodiment, it becomes possible to make a request to the administrator or the like to supplement input information necessary for issuing a maintenance notification before issuing the maintenance notification. As a result, when the maintenance notification is issued, sufficient input information is stored in the server apparatus 200. As a result, a timing at which a maintenance notification is issued is optimized.

As illustrated in FIG. 12, the response unit 362 and the display control unit 361 of the third embodiment may be mounted in the printer 100. That is, a maintenance notification and the UI 1700 may be displayed on the operation unit 212 of the printer 100, and maintenance information may be inputted via the operation unit 212.

<Technical Concepts Derived from Embodiments>

The CPU 85 and the first analysis unit 301 are examples of a first analysis unit. The CPU 85 and the notification unit 305 are examples of an issuance unit. The CPU 85 and the second analysis unit 302 are examples of a second analysis unit. The CPU 85, the communication circuit 202 and the requesting unit 304 are examples of a transmission unit. The CPU 85 and the threshold setting unit 504 are examples of a control unit. As described above, if information necessary for creating an analysis result is insufficient or old, a timing at which a maintenance notification is issued will be inappropriate. According to the first to third embodiments, the information necessary for creating an analysis result is additionally obtained, and so the timing at which a maintenance notification is issued will be more optimized than before.

The initial value E0 stored in the storage apparatus 86 is an example of an initial level of an ambient sound. The ambient sound level E1 is an example of a level of an ambient sound collected by a sound collecting sensor. As described above, the confidence C may be obtained and analyzed based on the ambient sound.

If the difference Ed exceeds the environment threshold Eth, it may be determined that the confidence has decreased.

Notification conditions set in a first period may be inappropriate in a second period. A good example thereof is a case in which an ambient sound of the first period and an ambient sound of the second period are remarkably different. Accordingly, when a significant environmental change is detected, the confidence of an analysis result has decreased.

The motors M1 to M4 are examples of a plurality of actuators. By collecting an ambient sound when all of the plurality of actuators are stopped, a more accurate ambient sound may be measured.

The CPU 80 and the engine control unit 216 of the printer 100 are examples of a feeding unit. As exemplified in FIG. 4, an operation history includes information indicating whether an actuator is operating and a sound level. Accordingly, it may be easier for the CPU 85 to identify a level of an ambient sound collected when all of the plurality of actuators are stopped.

A configuration may be taken so as to obtain an analysis result by analyzing the abnormal sound level N(I) and then determine whether the analysis result satisfies the notification conditions.

By thus analyzing the sound collected when an actuator is operating alone, analysis accuracy is improved.

The reference level R(I) may be stored.

By thus obtaining a reference level of an installation environment, the effect of noise occurring in the installation environment in which an image forming apparatus is set may be reduced.

As illustrated in FIG. 7, a subjective level of a running sound may be inputted. Whether the running sound is distracting to an inputter depends on the level of an ambient sound. A loudness of the running sound is known by design. Therefore, the subjective level of the running sound suggests a level of the ambient sound. Therefore, by setting the notification conditions according to the subjective level, a maintenance notification may be issued at an appropriate timing for that environment.

As described in the first embodiment, the notification threshold T may be determined based on the subjective level. Accordingly, a maintenance notification may be issued at an appropriate timing depending on the installation environment.

As described in the first embodiment, the notification threshold T may be corrected based on the environmental change. Accordingly, a maintenance notification may be issued at an appropriate timing depending on the installation environment.

As illustrated in FIG. 6A, actuators arranged in their respective areas within the printer 100 may be listed and managed. This makes it possible to identify an abnormal sound generation area.

As described with reference to FIGS. 14A to 14D, a configuration may be taken so as to identify an abnormal sound generation area in a first stage and identify a component generating the abnormal sound in a second stage. At this time, if contents (e.g., replacement, addition of grease) and a timing of maintenance are known, it may be easier to identify an abnormal sound generation component.

Generally, a life of a component for which maintenance is not performed is shorter than a life of a component for which maintenance is performed. Accordingly, a component for which maintenance is not performed is highly likely to be an abnormal sound generation component.

A maintenance history may include, for example, replacement information, which indicates a replaced component and a replacement timing, and maintenance information, which indicates contents of maintenance work and an execution timing thereof. Accordingly, if there is omission of information in the maintenance history, a confidence of an analysis result will decrease. By prompting an inputter to input the maintenance history for which input has been omitted, the maintenance history is supplemented, and thereby, a more accurate analysis result may be obtained. A noticeable abnormal sound being generated in a given area and there being no maintenance history for components arranged in that area are one of the notification conditions. The maintenance history being supplemented corresponds to an update of notification conditions.

As described above, if there is an inconsistency between a measurement result of a sound and the maintenance history, a confidence of an analysis result decreases. For example, if there is omission of information in the maintenance history, a confidence of an analysis result is decreased. By prompting an inputter to input the maintenance history for which input has been omitted, the maintenance history is supplemented, and thereby, a more accurate analysis result may be obtained.

As described in the third embodiment, there are cases where the abnormal sound level N(I) is not greater than or equal to the notification threshold T but is greater than or equal to the notice threshold TP. This suggests that a noticeable abnormal sound will soon occur. Therefore, by supplementing, in advance, information necessary for analysis, a confidence of an analysis result is improved.

As described in the third embodiment, when an abnormal sound generation source cannot be identified due to the maintenance history being insufficient, a request for input of the maintenance history may be made to the inputter. By supplementing, in advance, information necessary for analysis, a confidence of an analysis result is improved.

A maintenance notification, the UI 700, and the UI 1700 may be displayed on the operation unit 212 of the printer 100 or may be displayed on the operation unit 89 of the client apparatus 250. The maintenance notification may be displayed on the operation unit 212 of the printer 100, and the UI 700 and the UI 1700 may be displayed on the operation unit 89 of the client apparatus 250. On the contrary, the maintenance notification may be displayed on the operation unit 89 of the client apparatus 250, and the UI 700 and the UI 1700 may be displayed on the operation unit 212 of the printer 100. It is assumed that the monitoring tool 260, in particular, is operated by an administrator or the like of the printer 100. Therefore, information necessary for analysis of an abnormal sound will be accurately supplemented by the administrator or the like.

The server apparatus 200 is typically implemented in a computer. However, the server apparatus 200 may be implemented in a virtual environment. The server apparatus 200 may also be implemented in the printer 100.

A control program stored in the storage apparatus 86 and executed by the CPU 85 is an example of a program.

According to the first to third embodiments, a control method to be executed by an image forming system is provided.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-163585, filed Oct. 11, 2022 which is hereby incorporated by reference herein in its entirety.

What is claimed is:

1. An image forming system comprising:

a microphone configured to receive an acoustic wave;

one or more displays capable of displaying information;

an operation unit to which information is input;

a memory configured to store a program; and at least one processor configured to perform operations according to the program, wherein the operations include:

a first displaying operation in which the one or more displays display request information requesting input of information in a case where the microphone receives an acoustic wave larger than a predetermined intensity; and a second displaying operation in which the one or more displays display a diagnostic result based on the acoustic wave received by the microphone and the input information, and wherein the input information is information input to the operation unit as a response to the request information displayed on the one or more displays by the first displaying operation.

2. The image forming system according to claim 1, wherein the request information is information indicating a request for information regarding maintenance.

3. The image forming system according to claim 1, wherein the first displaying operation is performed in a case where a single source of an irregular sound is not identified, and wherein the first displaying operation is not performed in a case where a single source of an irregular sound is identified.

4. The image forming system according to claim 1, further comprising a plurality of actuators involved in forming an image on a sheet, wherein the second display operation, the at least one or more displays display the diagnostic result based on information on whether or not the plurality of actuators are operating, information on a date and a time the microphone received the acoustic wave, and the input information.

5. The image forming system according to claim 1, wherein the diagnostic result is information indicating a location of an irregular sound or information encouraging maintenance of parts.

* * * * *